Aug. 30, 1960 E. H. LAND ET AL 2,950,644
CINEMATOGRAPHIC METHOD AND APPARATUS
Filed April 25, 1955 14 Sheets-Sheet 1

INVENTORS
Edwin H. Land
and
David S. Grey
Broward McKuska
and
BY Robert E. Corb
ATTORNEYS

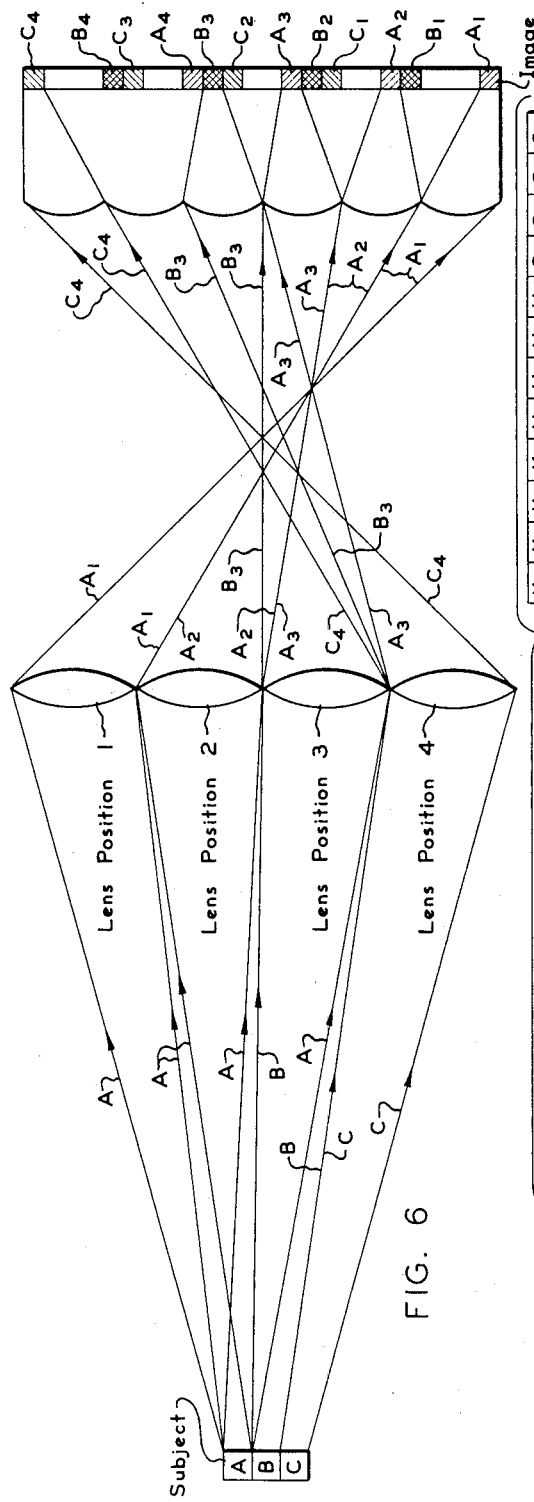

Aug. 30, 1960                    E. H. LAND ET AL                    2,950,644
                        CINEMATOGRAPHIC METHOD AND APPARATUS
Filed April 25, 1955                                              14 Sheets-Sheet 4

Cinematographic Record

FIG. 7

INVENTORS
Edwin H. Land
and
David S. Grey
Broward Mikulka
BY    and
Robert E. Corb
ATTORNEYS Aug. 30, 1960    E. H. LAND ET AL    2,950,644
CINEMATOGRAPHIC METHOD AND APPARATUS
Filed April 25, 1955    14 Sheets-Sheet 8

INVENTORS
Edwin H. Land
and
BY David S. Grey
Brown and Mikulka
Robert L. Corb
ATTORNEYS Aug. 30, 1960   E. H. LAND ET AL   2,950,644
CINEMATOGRAPHIC METHOD AND APPARATUS
Filed April 25, 1955   14 Sheets-Sheet 9
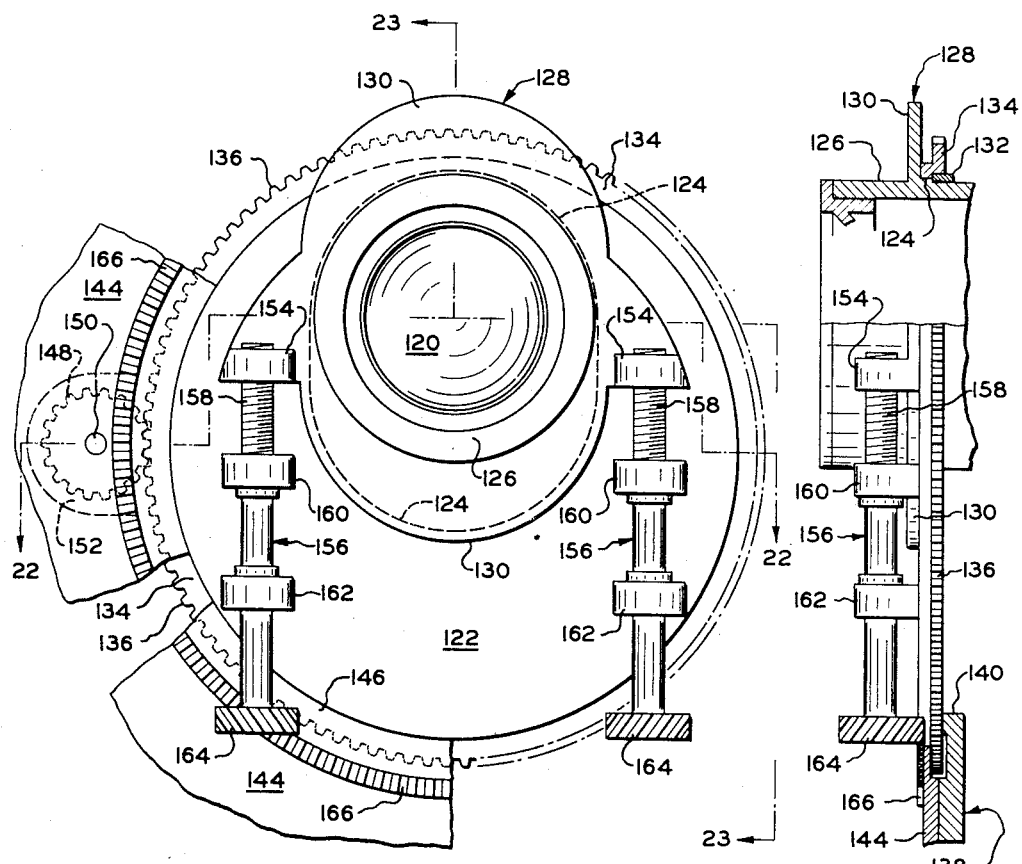
FIG. 21
FIG. 23
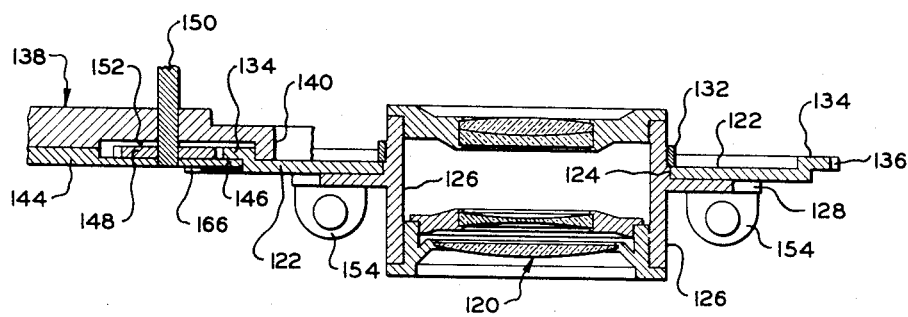
FIG. 22
INVENTORS
Edwin H. Land
and
BY David S. Grey
Howard Mikulka
and
Robert E. Cook
ATTORNEYS Inner Circular Path
Middle Circular Path
Outer Circular Path Aug. 30, 1960 E. H. LAND ET AL 2,950,644
CINEMATOGRAPHIC METHOD AND APPARATUS
Filed April 25, 1955 14 Sheets-Sheet 11

INVENTORS
Edwin H. Land
BY David S. Grey
Brown and Mikulka
Robert E. Corb
ATTORNEYS Aug. 30, 1960  E. H. LAND ET AL  2,950,644
CINEMATOGRAPHIC METHOD AND APPARATUS
Filed April 25, 1955  14 Sheets-Sheet 13

INVENTORS
Edwin H. Land
David S. Grey
BY Brown and Mikulka
and
Robert E. Corb
ATTORNEYS

United States Patent Office 2,950,644
Patented Aug. 30, 1960

2,950,644

CINEMATOGRAPHIC METHOD AND APPARATUS

Edwin H. Land, Cambridge, and David S. Grey, Weston, Mass., assignors to Polaroid Corporation, Cambridge, Mass., a corporation of Delaware Filed Apr. 25, 1955, Ser. No. 503,422

50 Claims. (Cl. 88—16)

This invention relates to cinematography and particularly to novel methods of and apparatus for producing and exhibiting motion pictures.

In conventional cinematographic methods, an elongated film strip is moved intermittently past a camera lens, the movement of the film being coupled with the action of a shutter to produce in successive frames of the film, in rapid succession, a sequence of images of a moving subject. Exhibition of the sequence of images to create the appearance of motion is substantially the same as the taking process, with illuminating light directed oppositely from the taking light, the film being moved intermittently and each frame thereof being viewed or projected in rapid succession. This method has certain disadvantages since it involves the use of film strips of substantial length and presents many attendant problems not the least of which is processing of the film requiring considerable skill and equipment not available to the average "amateur" cinematographer. Motion picture scenes are of a finite duration and it has been found that for most practical purposes, the duration of a scene may be, for example, of the order of five seconds. The present invention comprehends the production of a scene of satisfactory duration in a single film frame or slide which may then be easily processed by conventional photographic methods, and preferably processed immediately after taking in the camera itself by diffusion transfer-reversal.

Accordingly, it is an object of the present invention to provide methods of and means for producing, in a single frame or slide, a photographic record of a moving subject, and exhibiting the photographic record in said frame or slide to create the appearance of comtinuous motion in a scene of finite duration.

Another object is to provide methods of and means for producing and exhibiting a composite photographic record comprising a multiplicity of sequentially formed images of a moving subject to create the appearance of motion.

A further object is to provide photographic methods of and means for producing, in a single frame or slide, a photographic record of a moving subject composed of a sequence of images arranged in a pattern in said frame or slide, each sequential image comprising a multiplicity of elements, and for projecting said photographic record to create the appearance of motion in the scene depicted.

A still further object is to provide an optical system including a large apertured lens and means for moving an aperture in a pattern with respect to said lens for producing a composite cinematographic record depicting a moving subject and for exhibiting the record to create the appearance of motion.

Still another object is to provide an optical system including a small apertured lens and means for moving the lens in a pattern for producing a composite cinematographic record depicting a moving subject and for exhibiting the record to create the appearance of motion.

Still further objects of the present invention are: to provide methods of and means for producing a photographic record of the above type which may be exhibited in color; to provide methods of and means for producing a photographic record of a moving subject in a single frame of a photosensitized surface by sequentially exposing said surface to light emanating from a optical system including a taking lens and, during exposure, moving the location in said system from which the light emanates in a pattern relative to said surface and methods of and means for projecting the record so made to create the appearance of motion; to provide methods of and means for producing a photographic record of a moving subject in a single frame of a photosensitive emulsion layer by sequentially exposing said emulsion layer through a lenticulated film to light comprising a beam emanating from a taking lens and having a predetermined cross-sectional area at said lens and, between successive exposures, moving the position at which said light beam emanates from said lens in a pattern relative to said emulsion layer, and methods of and means for projecting the record so formed to create the appearance of motion; to provide methods of and means for producing a photographic record of a moving subject in a single frame of a photosensitized surface by sequentially exposing said surface to light emanating from a taking lens and moving said lens in a pattern relative to said photosensitized surface, and methods of and means for projecting the record so formed to create the appearance of motion; and to provide methods of and means for producing a stationary image in a photosensitive emulsion layer with a lens which is moving in a pattern with respect to said emulsion layer.

Other objects of the invention will in part be obvious and will in part appear hereinafter.

The invention accordingly comprises the process involving the several steps and the relation and order of one or more of such steps with respect to each of the others, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 5 is a schematic diagram of a subject and a composite cinematographic record of the subject produced by the system and method of Fig. 4;

Fig. 6 is a schematic diagram illustrating another optical system for and method of producing a composite cinematographic record by shifting or moving a camera lens in a pattern with respect to a photosensitized surface;

Fig. 7 is a diagram of a composite cinematographic record of the subject of Fig. 5 produced by the system and method of Fig. 6;

Fig. 21 is a plan view, with portions broken away, of one embodiment of means for moving a photographic objective lens in a pattern;

Fig. 22 is a sectional view taken along the line 22—22 of Fig. 21;

Fig. 23 is a sectional view taken along the line 23—23 of Fig. 21;

The present invention is concerned with a method whereby a photographic film assemblage including a photosensitive element may be exposed and processed in a camera to produce, in a single frame and preferably in a projected slide, a photographic record of a scene including moving objects and of predetermined maximum duration. The slide as produced in the camera may be viewed or projected immediately to recreate the scene and the motion of the objects depicted. The film assemblage includes a transparent film or layer having a surface which is goffered with a gridlike arrangement of a multiplicity of minute optical elements, preferably generally spherical lenticules, and a photosensitive emulsion layer disposed immediately adjacent or formed integrally with the lenticulated film. The photographic record formed in either the emulsion layer or in an image-receiving layer disposed adjacent or formed integrally with the lenticulated film, so as not to disturb the registration between the record and the lenticules, is adapted to be viewed or projected through the lenticulated film and comprises a pattern of components corresponding to the lenticulations, each component in turn comprising a multiplicity of elements of successive images of the object depicted. The slide carrying the photographic record is viewed or projected so as to exhibit in rapid succession, in the same order and frequency as taken, the sequential images of a moving object to create the appearance of motion.

Figure 1:
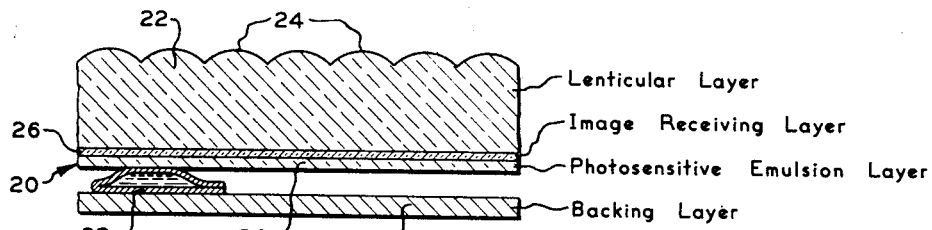
Figure 1 is a diagrammatic sectional view of a film assemblage adapted to use in the present invention.

One embodiment of a film assemblage 20 suitable for carrying out the invention is illustrated in Fig. 1 and comprises a transparent support or film 22 having one surface thereof goffered with a multiplicity of lenticules 24 and provided on the other surface thereof with an image-receiving layer 26 and a photosensitive layer 28, image-receiving layer 26 being located next to support 22. Additionally, the film assemblage includes a backing layer 30 which provides an outermost layer of the assemblage and has a rupturable container 32 positioned between backing layer 30 and photosensitive layer 28. Container 32 is adapted to carry a suitable processing liquid preferably of a viscous nature. Exposure of the film assemblage 20 is through lenticulated support 22, lenticules 24 thereof acting to suitably direct the light onto various portions of photosensitive layer 28. In order to carry this out, image-receiving layer 26 is, of course, of a transparent material and, in this embodiment, backing layer 30 may be opaque.

Backing layer 30 provides an outermost layer for the assemblage permitting both photosensitive layer 28 and image-receiving layer 26 to be located at one side of container 32. In the film structure illustrated, image-receiving layer 26 is made extremely thin so as to provide a structure which is sibstantially the equivalent of a photosensitive layer disposed immediately adjacent a lenticular layer. It is essential that substantially the same registration be maintained between the lenticules and the emulsion layer as between the lenticules and the positive image. It is by virtue of this arrangement that not only is parallax reduced to a minimum during taking or exposure and viewing, but substantially perfect registration between the images and the lenticules is maintained during both taking and viewing.

The liquid carried by container 32 is preferably capable of effecting a diffusion transfer-reversal process when impregnated into photosensitive layer 28, the backing layer 30 aiding in the distribution of the processing liquid upon said photosensitive layer. The film assemblage includes all the layers required to effect this process, photosensitive layer 28 preferably comprising an emulsion of silver halide in which a latent image may be attained by differential exposure to actinic light and the liquid within container 32 preferably including a film-forming agent such, for example, as carboxymethyl cellulose and also serving as a solvent for a silver halide developer and a silver halide fixer, both of which may be included in the liquid or incorporated in some layer of the film assemblage into which the processing reagent is impregnated. The liquid contents of container 32, when distributed upon the photosensitive layer, permeate or impregnate that layer and the exposed silver halide is reduced to silver and unreduced silver halide forms a complex silver salt which diffuses through the photosensitive layer to the image-receiving layer where is is reduced to silver to form a visible print.

In use following exposure, the film assemblage 20 is adapted to be processed in the absence of actinic light by moving the assemblage between a pair of pressure-applying members, preferably rollers, to rupture the container and spread its liquid contents between backing layer 30 and photosensitive layer 28. This processing is carried out in the absence of actinic light for a period, for example, of from 40 to 120 seconds after which the lenticular layer or transparent support 22, together with the image-receiving layer 26, is separated as by stripping from photosensitive layer 28 and backing layer 30, the organic film-forming constituent of the processing composition being adapted to bond the photosensitive layer 28 to backing layer 30 by a bond which is stronger than the bond between the photosensitive layer and the image-receiving layer. The foregoing and other types of film assemblages and processes useful in the present invention are disclosed in deatil in copending application Serial No. 265,413, filed January 8, 1952 for Photographic Product, Patent No. 2,726,154, issued December 6, 1955.

Figure 3:
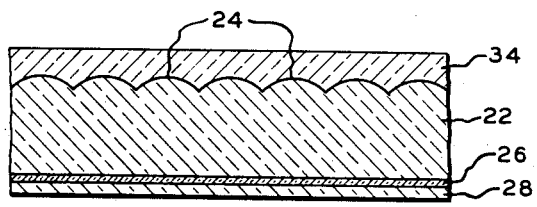
Fig. 3 is a diagrammatic sectional view of another type of film assemblage suitable for use in the present invention.
Figure 2:
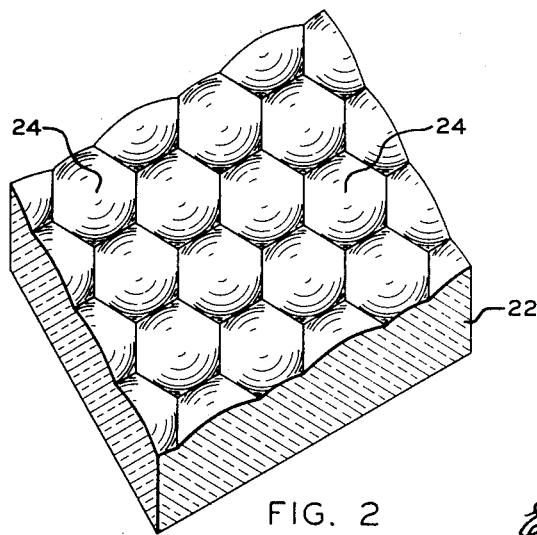
Fig. 2 is a fragmentary perspective view of a portion of one element of the film assemblage of Fig. 1.

As illustrated in Figs. 1 and 2 the goffered surface of transparent support layer 22 is embossed or molded, preferably, with a multiplicity of hemispherical lenticules arranged in a mosaic, for example, of hexagonal pyramids so that the lenticules are nested with a minimum of interstitial area. Each lenticule comprises a minute optical element or lens the focal length of which is a function of the effective aperture and focal length of the camera lens, and the diameter of the lenticule. Thus, for example with a camera lens operating at an opening of $f/2.5$, the focal length of lenticules having an effective diameter of .020 inch would be .050 inch. The thickness of the lenticular layer is a function of the focal length of the lenticules and the index of refraction of the material comprising the lenticules so that a lenticular layer having lenticules of .050 inch focal length and composed of a material having an index of refraction of 1.5 would be approximately .075 inch thick. It becomes apparent from consideration of the foregoing example that lenticular layers may be required to be comparatively thin and may not only be lacking in the structural strength and rigidity required for the support of a projection slide, but could easily suffer damage due to handling. The effective thickness of the lenticular support may be increased by coating, on its lenticulated side, a thin layer of transparent material whose index of refraction is considerably different from that of the lenticular layer. Fig. 3 illustrates this embodiment, the lenticular layer being indicated at 22 with spherical lenticules 24 coated with an outer layer 34 of a transparent material having an index of refraction considerably greater than that of layer 22. It is also possible to use a coating layer 34 of a material whose index of refraction is lower than that of lenticulated layer 22, in which case the curvature of the lenticules would be in the opposite direction from that indicated in Fig. 3. Because of their small size, any coating of foreign material on the surface of the lenticules such as moisture, grease or oil due, for example, to manual handling would prove somewhat critical and affect the optical properties of the lenticules, whereas with the increased thickness of the lenticulated support provided by outside layer 34, minute coatings of foreign materials are no longer as critical and do not appreciably affect the optical properties of the lenticulated layer.

It has been discovered that the density of the positive image produced by silver halide diffusion transfer-reversal processes may be much greater than the density of the negative image. This intensification in the density of the positive image has been found to be of the order of 5 to 6 times, thus making it possible to allow the negative and positive images to remain in contact with each other. This, of course, may result in some graying of the highlights of the positive image but this is generally unobjectionable, particularly for projection purposes since there is considerable difference in density between positive and negative images. This arrangement makes it possible to give added structural strength and rigidity to the finished assemblage by providing a backing layer 30 of a transparent material such as that employed for lenticulated layer 22 and which is not stripped, with photosensitive layer 28, from image-receiving layer 26 but is permitted to remain in contact with photosensitive layer 28, the latter remaining in contact with image-receiving layer 26.

To produce a cinematographic record of a scene of finite duration and including moving objects in a single projection slide or film frame, a photographic film assemblage of the type disclosed is positioned in the camera for exposure to light emanating from a "taking" lens. Exposure of the film assemblage may be either continuous or intermittent and is such as to form sequential latent images of the scene to be recorded, in rapid succession, in the photosensitive layer underlying the lenticular layer. Between intermittent sequential exposures, or during continuous sequential exposure, the locus of the "taking" light emanating from the camera lens is shifted or moved with respect to the film assemblage in a pattern so that each lenticule images the light from the lens on a different area underlying each lenticule. A succession of images is thus formed in a pattern of components corresponding to and underlying the lenticules, each component in turn comprising a pattern of elements corresponding to the pattern of movement of the locus of light emanating from the lens. Thus, each successive image comprises a multiplicity of elements underlying different lenticules and may be projected or viewed by methods which are substantially the reverse of the taking process.

Figure 4:
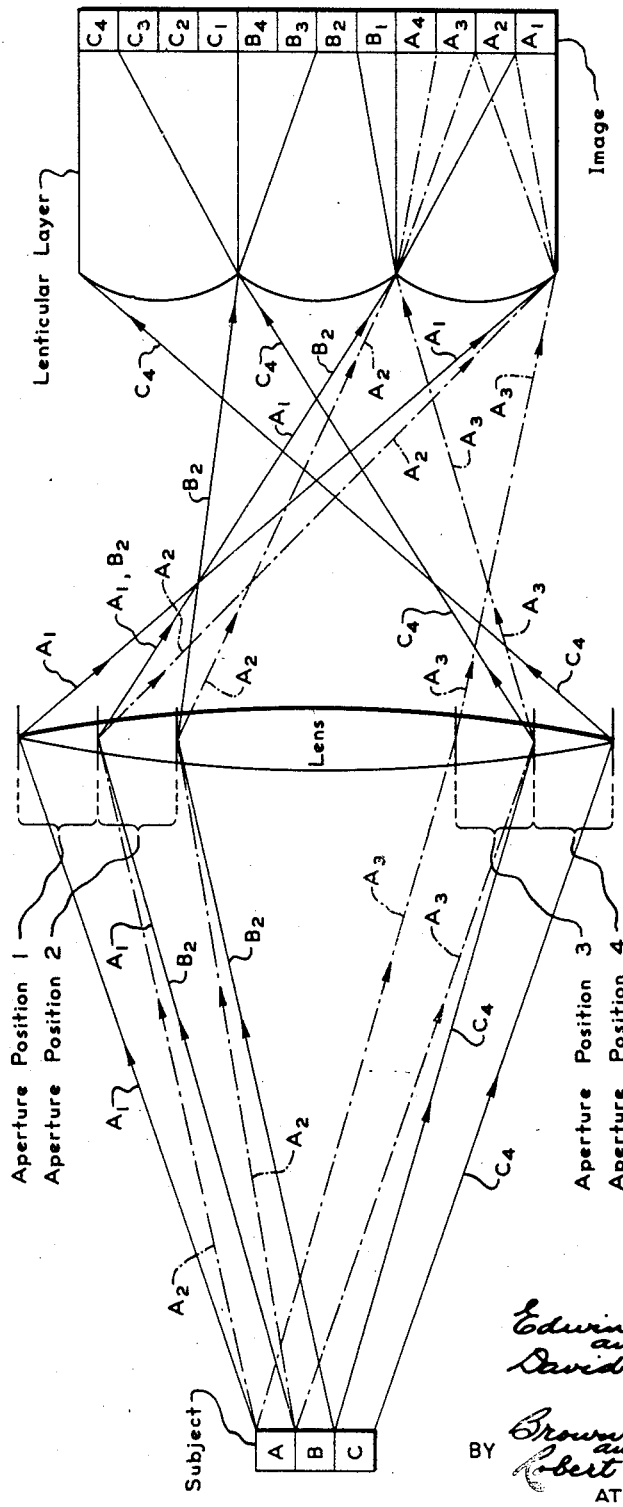
Fig. 4 is a schematic diagram illustrating one optical system for and method of producing a composite cinematographic record by shifting or moving the locus of a light-transmitting area of a camera lens.

One method of producing a composite cinematographic record by shifting or moving the locus of light emanating from the camera lens is illustrated diagrammatically in Fig. 4 and comprises moving an aperture in a pattern around a "fast" or large apertured "taking" lens. Consider beams A, B and C from sections A, B and C, respectively, of the subject to be photographed, entering a large apertured lens. There is provided means forming a smaller movable aperture which may be moved or shifted to four successive positions indicated as 1, 2, 3 and 4 so that the beams emanating from the lens with the movable aperture at position 1 are indicated $A_1$, $B_1$ and $C_1$, at position 2 are indicated $A_2$, $B_2$ and $C_2$, etc. The beams emanating from the lens pass through a lenticular layer, three lenticules of which are shown for purposes of illustration in greatly exaggerated form. A first lenticule in position relative to the other lenticules diametrically opposite to the position of subject section A images each successive beam from section A with the movable aperture at each successive position in an area of the emulsion underlying the lenticule. Each successive image or image element of subject section A is formed in a relative position underlying the first lenticule which is the reverse of the position of the movable aperture during formation of the image element. In the same manner, beams from subject sections B and C are imaged on the emulsion layer by the other two lenticules.

The location and positioning of the components of the cinematographic record and the elements of each component are further illustrated in Fig. 5. Consider a subject divided into nine equal areas or sections designated, A, B, C, D, E, F, G, H and K. The cinematographic record is indicated as being divided into nine components each underlying a lenticule and being located in positions corresponding to the positions of the nine subject sections. The movable aperture of the "taking" lens is moved in a pattern over lines or rows from left to right progressing from top to bottom of the lens relative to the lenticular layer, while sixteen successive exposures are made, four exposures to each row. The sixteen successive image elements of subject section A designated $A_1$, $A_2$ ... $A_{16}$ are formed in the component area underlying the lenticule which is in a position just the reverse of the position of subject section A. The image component underlying the lenticule is entirely filled with image elements arranged in four rows of four elements each, reversely corresponding to the pattern of movement of the movable aperture. Likewise sixteen successive reversed images of the subject section B are formed in a component area underlying a second lenticule located in position the reverse of the position of subject section B, and so forth for the image elements of the other subject sections. The first image of the subject is composed of elements $A_1$, $B_1$, $C_1$, etc. located in the cinematographic record reversely positioned with respect to corresponding subject sections, each sequential image of the subject being composed in the same manner.

For purposes of illustration, the record component underlying each lenticule is shown as being composed of sixteen elements and would be sufficient to record a scene of one second duration if made at the rate of 16 exposures per second (as in standard 8 mm. cinematography). This may be considered to be the minimum number of elements per component area necessary for creating the appearance of continuous motion for any appreciable period. However, the number of elements which may be formed in a component area of a particular size is limited only by the resolving power of the emulsion used and thus, for example, to produce a record of a scene of five seconds' duration at sixteen exposures per second, a pattern of eighty image elements would be formed in the component area underlying each lenticule. The pattern of movement of the movable aperture has been shown for illustration purposes as being in a series of parallel, substantially straight rows. However, it would be more convenient when using, for example, a lenticular layer having a multiplicity of hexagonally nested spherical lenticules, to shift the movable aperture in a spiral pattern or a pattern of concentric circles. This pattern of movement would more fully utilize the hexagonal component area underlying each spherical lenticule while maintaining the intersticial area between record components at a minimum. The advantages and convenience of this system may be best appreciated when it is considered, for example, that a cinematographic record of 5 seconds' duration and which is the equivalent of standard 8 mm. motion pictures (16 frames per second), may be produced in a frame or slide measuring approximately 1½ by 2¼ inches and may be taken and completely processed in a hand-held camera. Further still, the cinematographic record may be produced and viewed or projected in color by providing, for example, a tricolor filter comprising each of the primary colors, positioned so as to completely fill the movable aperture of the taking lens, and by providing filters for dividing the viewing or projecting light into the same three colors. Each image element thus formed would comprise three smaller or sub-elements representing the intensity of the primaries in the taking beam forming the image elements and are viewed or projected through filters of the same primary colors to create the appearance of the colors of the subject depicted.

Another method of producing a composite cinematographic record by shifting or moving the locus of light emanating from a camera lens is illustrated diagrammatically in Fig. 6 and comprises moving a "slow" or relatively small apertured "taking" lens in a pattern with respect to the lenticulated and emulsion layers. Consider a small apertured lens movable to each of four consecutive positions and beams designated A, B and C from, respectively, subject sections A, B and C passing through the lens at each of the four positions. The beams emanating from the lens at each position pass through three of six lenticules, shown for purposes of illustration in greatly exaggerated form, and are imaged on the areas of the emulsion layer underlying the three lenticules. Thus, for example, a beam from subject section A passing through the lens at position 1 and indicated $A_1$ is reversed, passes through the lenticule inversely positioned with respect to the lens position and is imaged in the emulsion area underlying the lenticule to form an image element designated $A_1$ located in a position which is the reverse of the position of the subject section. Beams from subject sections B and C also passing through the lens at position 1 fall on the next two lenticules which are in reverse position with respect to lens position 1 and are imaged on areas of the emulsion underlying the lenticules in positions reversely correnponding to the positions of subject sections B and C. In the same manner, a beam from subject section A passing through the lens at position 2 enters the lenticule which previously imaged beam $B_1$ and is imaged in the emulsion layer adjacent element $B_1$. So also is a beam from subject section A, passing through the lens at position 3, imaged by the same lenticule which previously imaged beams $C_1$ and $B_2$ to form an image element adjacent image element $B_2$, the latter having been formed adjacent image element $C_1$.

The location and positioning of the components of the cinematographic record and the elements of each component are further illustrated in Fig. 7. Consider the subject of Fig. 5 and a cinematographic record as indicated in Fig. 7 being divided into 36 equal components each underlying a lenticule and being located in six rows of six each. The "taking" lens is moved in a pattern of lines or rows from left to right progressing from top to bottom, that is, in substantially the same pattern as was the movable aperture in Fig. 5, while sixteen successive exposures are made, four exposures to each of the four rows. Also as in Fig. 5, the beams emanating from the lens in each successive position of the lens pass through nine of the lenticules but because the position of the lens is shifted relative to the lenticular layer for each successive exposure by the distance of one lenticule, a beam emanating from the lens then passes through only six of the lenticules through which the beam passed during the previous exposure at the previous position. Because of this shifting of the locus of the lens, the linear dimensions of a record formed by this method is equal to the linear dimensions of the record formed by moving an aperture of equal size in the same pattern (Fig. 5), plus the linear dimensions of the area over which the movement takes place, and in the form shown, the area of the record is four times the area of a comparable record made by moving an aperture of equal size around a large apertured lens and only a quarter of the available area of the record being utilized.

The record of Fig. 7 may also be produced and exhibited in color by employing a tricolor filter in conjunction with the movable taking lens and by viewing or projecting the record through filters of the same colors. The projection or viewing system for a record made by moving the taking lens is substantially the reverse of the taking system and consequently would be unsuitable for viewing a cinematographic record made by moving an aperture around a "fast" taking lens.

Figure 8:
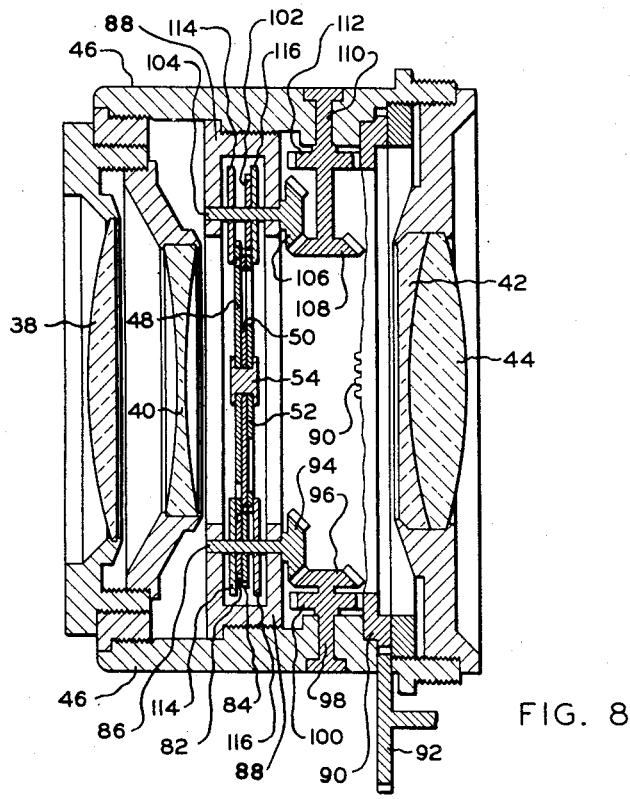
Fig. 8 is a sectional view of a photographic objective lens embodying means for moving an aperture in a pattern.
Figure 9:
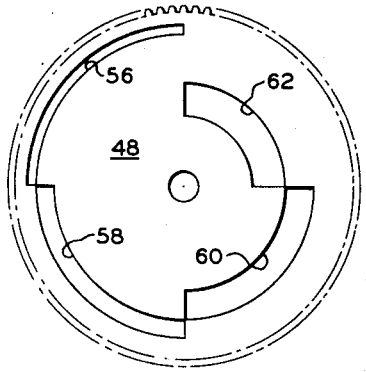
Figs. 9, 10 and 11 are somewhat diagrammatic plan views of elements of the aperture-moving means of Fig. 8.
Figure 10:
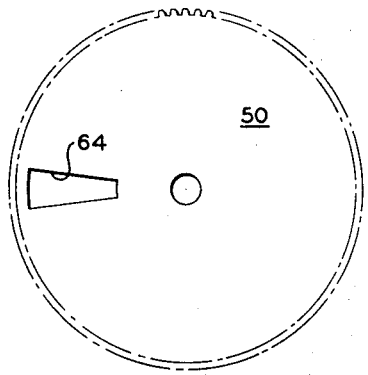
Figure 11:
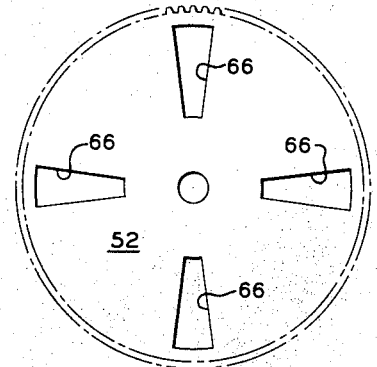

Reference is now made to Figs. 8 through 11 wherein there is illustrated one embodiment of means for moving an aperture in a pattern of concentric circles. The aperture-moving means may be associated with any suitable lens system and for purposes of illustration is shown in Fig. 8 as embodied in a conventional compound lens comprising elements 38, 40, 42 and 44 mounted in a cylindrical lens barrel 46. The aperture-moving means comprises three circular disks 48, 50 and 52 coaxially mounted adjacent one another on a shaft 54 for rotary movement about the axis of the lens. Disks 48 and 50 cooperate with each other to form and move an aperture in a pattern of concentric circles while disks 50 and 52 cooperate in the nature of a shutter to provide for a succession of exposures of predetemined duration and frequency at each discrete position of the movable aperture. While disk 52 cooperates to provide intermittent discrete exposures, it is not essential since the exposure time (shutter speed) can be controlled by the moving aperture and is a function of the time required for the moving aperture to travel a distance equal to its own angular length.

Disk 48 is provided with a plurality of arcuate slots of equal angular length and in the form shown includes four arcuate slots 56, 58, 60 and 62, each 90° in length. Each arcuate slot is located at a different radial distance from the center of disk 48 with the radial widths of the slots being such that when disk 48 is rotated, the slots scan a series of four contiguous concentric circles. Disk 50 includes a radial slot 64 the sides of which are radii and the length of which is at last equal to the combined radial width of the slots in disk 48. The scanning aperture is defined by the intersection of a slot in disk 48 with slot 64 in disk 50, the radial sides of slot 64 defining the angular dimension of the aperture and the arcuate sides of the slots in disk 48 defining the radial dimension of the aperture.

To move the aperture, so formed, in a series of concentric circles, disks 48 and 50 are rotated in the same direction at different speeds so that slot 64 in disk 50 intersects only one of the slots in disk 48 during a revolution of the latter and intersects a different slot during each successive revolution of disk 48. To move an aperture, for example, through 80 distinct positions at the rate of 16 exposures per second for five seconds, aperture 64 in disk 50 would have an angular width of 18°, disk 48 would be rotated at the rate of ⅘ of a revolution per second and disk 50 would be rotated in the same direction at one revolution per second. The duration of each sucessive exposure, or the "shutter speed" achieved by moving an aperture in this manner, would approximately ⅟₁₆ of a second.

To effect a series of sucessive discrete exposures of predetermined duration and frequency, disk 52 includes a plurality of radial slots 66 substantially equal in size and shape to slot 64 in disk 50. Disk 52 is rotated in the opposite direction from disks 48 and 50 so that an exposure is made each time a slot 66 in disk 52 becomes aligned with slot 64 in disk 50, the duration of the exposure being a function of the angular speed of disk 52. If disk 50 includes a slot 64, 18° in width, and is rotated at one revolution per second to produce 16 exposures per second, disk 52 would, for example, be provided with four slots 66, each 18° in width and spaced 90° apart, and would be rotated in the opposite direction from disk 50 at 4⅘ revolutions per second. This arrangement would give the equivalent of a shutter operating at a "speed" of ⅟₁₂₀ of a second. To vary the shutter speed, the angular width of slot 66 in disk 52 can be either increased or decreased, for example, to provide for a shutter speed of ⅟₆₀ of a second with disk 50 rotating at 4⅘ revolutions per second, slot 66 would be 36° in angular width.

Means are provided for mounting and driving disks 48, 50 and 52 and in the form shown comprise six sets of drive gears adapted to engage and mesh with gear teeth formed in the peripheries of the disks to rotate the latter and to support the disks in position within the lens barrel. To rotate disks 48 and 50 in one direction, there are provided gears 82 and 84 meshed with, respectively, disks 48 and 50 and mounted on a common shaft 86. Since disk 50 is rotated at greater angular velocity than disk 48, gear 84 is of greater diameter than gear 82, both of said gears being keyed to shaft 86 and therefore rotated at the same speed. In order to support disks 48 and 50 with shaft 54 in the axis of the lens, there may be provided three sets of gears 82 and 84 each mounted on a shaft 86 in engagement with disks 48 and 50 and spaced 120° apart. Shafts 86 may be journaled in a generally U-shaped mounting ring 88 secured within lens barrel 46. To drive one or all three sets of gears 82 and 84 simultaneously and at the same speed, there is provided a ring gear 90 adapted to rotate within barrel 46. Ring gear 90 may be driven as illustrated by a gear 92 projecting through an opening in lens barrel 48 meshed with ring gear 90 and itself being coupled with some suitable drive means. Shafts 86 are operatively connected to ring gear 90 through bevel gears 94 secured to shafts 86 and meshed with bevel gears 96 secured to shafts 98 journaled in lens barrel 46. To transmit the motion of ring gear 90 to shafts 98, spur gears 100 are keyed to shafts 98 and meshed with ring gear 90. Disk 52, which is rotated in the opposite direction from disks 48 and 50, is driven by a gear 102 mounted on shaft 104, the latter being journaled in mounting ring 88. There may be provided three sets of shafts 104 and gears 102 mounted on ring 88 and spaced 120° apart and positioned opposite or 180° from each set of gears 82 and 84. To drive gears 102 secured to shafts 104, there are provided bevel gears 106 mounted on shafts 104 and meshed with bevel gears 108 secured to shafts 110 journaled in the same manner as shafts 98 in lens barrel 46. Shafts 110 are driven by spur gears 112 keyed to and meshed with ring gear 90. To prevent axial movement of disks 48, 50 and 52, there are provided disks 114 and 116 secured to shafts 86 and 104 so that disks 114 engage the priphery of disk 48 and disks 116 engage the periphery of disk 52.

Figure 12:
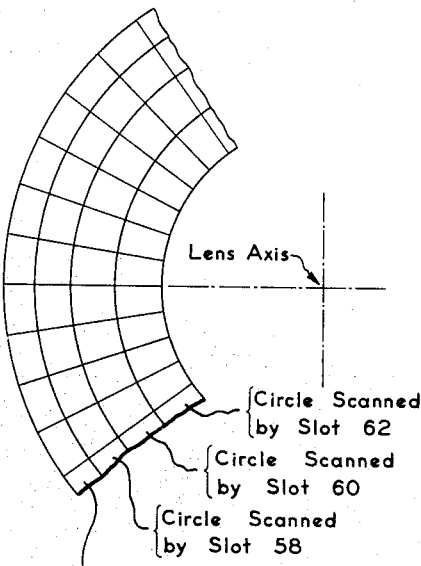
Fig. 12 is a diagram of the pattern of movement of the aperture-moving means of Fig. 8.
Figure 15:
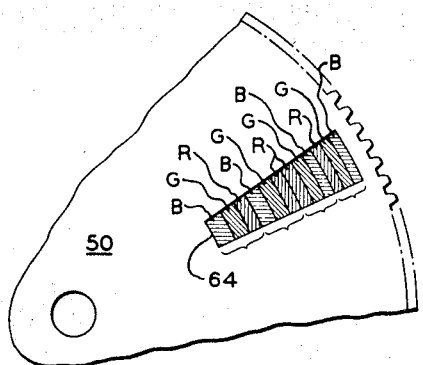
Figs. 14, 15, 16 and 17 are views of the elements of Figs. 9 and 10 adapted to color cinematography.

It is apparent that when disks 48 and 50 are rotated at constant angular velocity, the angular dimension of the aperture defined by the intersection of the diverging radial sides of slot 64 with one of the arcuate slots in disk 48 varies as the distance of the slot in disk 48 from the center of said disk. However, it is important that the area of the moving aperture be kept constant regardless of its position and this may be effected by forming the arcuate slots in disks 48 so that their relative radial widths vary inversely as their distances from the center of the disk. The most efficient utilization of the resolving power of the emulsion can be realized when the length and width dimensions of the aperture are most nearly equal, while it is inefficient to move an operture which is elongated and narrow. Since the difference in length and width dimensions of an aperture formed and moved by the means shown is at an extreme when the aperture is at either the outside portion or the central portion of the circular area scanned, in the preferred form, disk 48 is provided with no more than three or four arcuate slots which extend approximately half the distance from the edge to the center of the disk. By virtue of this arrangement, the extremes of difference between aperture length and width are avoided and ⅔ of the available lens area is scanned by the aperture. The pattern scanned by an aperture defined by the intersection of a radial slot with four arcuate slots such as those illustrated and a radial slot in disk 48 is shown in Fig. 12. The apertures in the two intermediate circles scanned by slots 58 and 60 are approximately square and while the apertures in the outer and inner circles scanned by, respectively, slots 56 and 62 are rectangular and somewhat elongated, the difference between their length and width dimensions is not as extreme as it would be if the circles were scanned substantially to the center of the lens. If only three arcuate slots are provided in disk 48, then the difference in length and width dimensions of the apertures moved in the outer and inner circles is even less extreme.

Figure 13:
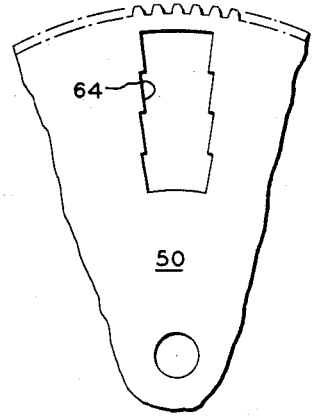
Fig. 13 is a somewhat diagrammatic plan view of a portion of one element of means for moving an aperture in a pattern.

In another but less preferred method for moving an aperture of constant area in contiguous concentric circles, disk 48 is provided with arcuate slots of equal radial width and disk 50 with a radial slot of constant angular width where it intersects with the slots in disk 48. A disk 50 of this type is illustrated in Fig. 13, it being apparent that the aperture is defined by the intersection of two slots the width dimensions of which do not vary. However, so that the aperture does not overlap the area previously scanned with each successive exposure, the angular velocity of rotation of the disks 48 and 50 must be varied, i.e., increased as the aperture is moved toward the center of the lens and decreased as it is moved outward.

Figure 14:
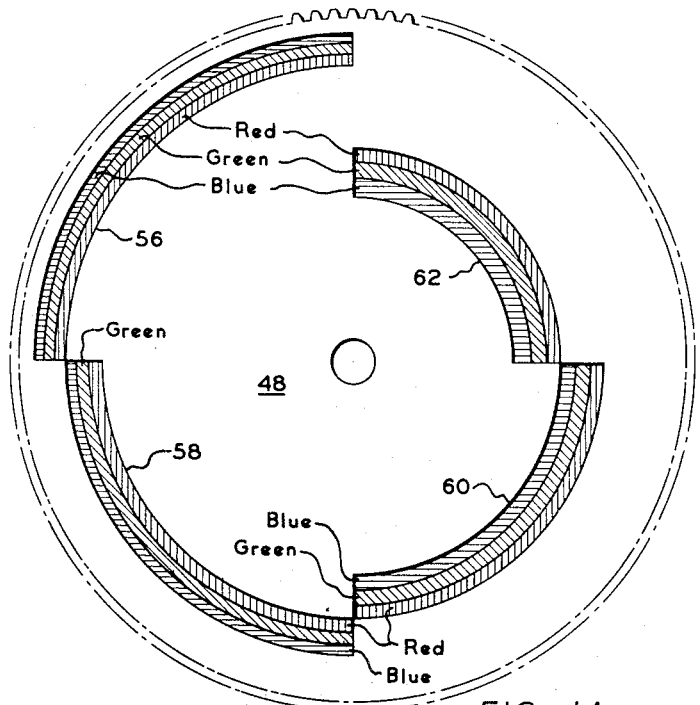

This method of moving an aperture in a series of contiguous concentric circles can be adapted to color cinematography by means illustrated in Figs. 14 through 17 and, in one form shown in Fig. 14, slots 56, 58, 60 and 62 in disk 48 are provided with tricolor filters which completely fill the slots. Each filter comprises three arcuate elements, for example of red, green and blue, which vary in radial width according to their proximity to the center of the disk and are in the same proportion by which the radial widths of the slots vary, in order that the area of the colored elements in the moving aperture are equal. Since resolution of the image produced by light passing through the blue filter element is the least critical and, conversely, the red and green images are more critical, in slots 56 and 58 the blue filter element occupies the outer portion of the slot at which the aperture is most elongated, and in slots 60 and 62 the blue filter element occupies the inner portion of the slot. Conversely, the red and green filter elements occupy the inner portions of slots 56 and 58 and the outer portions of slots 60 and 62. The same effect as providing tricolor filters in the arcuate slots in disk 48 may be achieved by providing four radially spaced tricolor filters in radial slots 64 in disk 50 (Fig. 15), each filter being so positioned as to intersect a slot in disk 48. The different colored elements comprising these filters are of the same proportionate radial width as those in disk 48 and are in the same relative positions.

Figure 17:
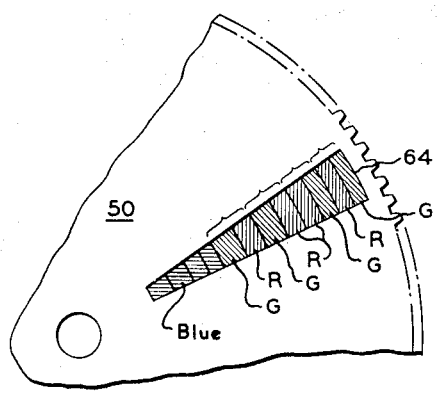
Figure 16:
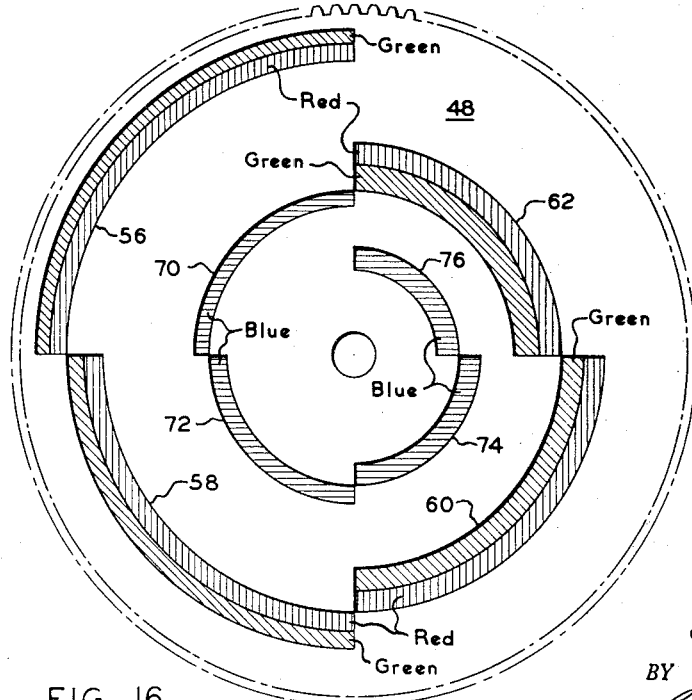

Another means for moving an aperture in concentric circles and adapted to color cinematography is based on the aforementioned fact that resolution of the blue image is not critical and is illustrated in Fig. 16. Slots 56, 58, 60 and 62 in disk 48 are provided with only bicolor filters, for example filters comprising arcuate red and green elements. Disk 48 includes a second set of four arcuate slots designated 70, 72, 74 and 76 each 90° in length and arranged so as to scan four contiguous concentric circles of varying radial width within the circle scanned by slot 62. The outermost of the second or inner set of slots 70, for example, is adapted to scan an aperture parallel to and simultaneously with the aperture scanned by slot 56, both of said slots intersecting the same radial slot in disk 50. Slots 70, 72, 74 and 76 are provided with blue filters, the areas of which are equal to, respectively, the areas of the red and green filters in slots 56, 58, 60 and 62. In this manner, two apertures, one being twice the area of the other and having a bicolor filter (red and green) and the other having a blue filter, are moved simultaneously and in similar patterns of concentric circles. Another means for simultaneously scanning two sets of concentric circles, one for red and green and the other for blue, is illustrated in Fig. 17 and comprises providing four bicolor (red and green) filters and one blue filter in radial slots 64 in disk 50. Disk 48 would have two sets of four arcuate slots, the outer set intersecting the four bicolor red and green filters and the inner set intersecting the blue filter.

Figure 18:
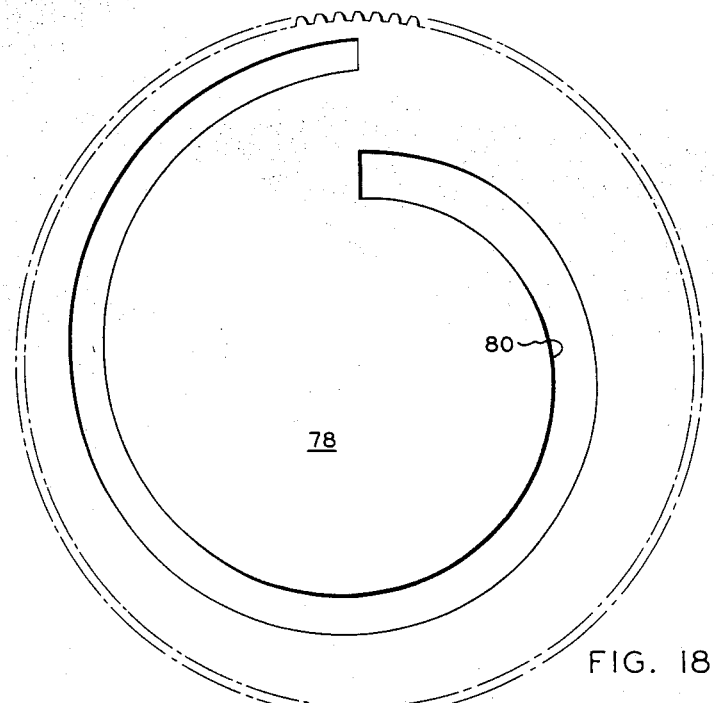
Fig. 18 is a somewhat diagrammatic plan view of one element of another means for moving an aperture in a pattern.

As a means for moving an aperture in a spiral pattern, a disk 78 may be provided with a single spiral slot 80, as shown in Fig. 18, adapted to intersect with the radial slot in disk 50 to define an aperture. Disk 78 may be rotated coaxially with disk 50 in the same manner as disk 48 to scan a spiral of four complete contiguous circles. In order to maintain the area of the moving aperture constant as the disks are rotated at constant angular velocity, the radial width of spiral slot 80 in disk 78 varies inversely as the distance from the center of the disk, that is, slot 80 is narrower adjacent the outside edge of the disk than it is nearer the center. This variation in radial width of the spiral slot is the equivalent of the variation in width of the arcuate slots in disk 48 and serves the same purpose. Disk 78 may also be adapted to color cinematography in the same manner as disk 48 by providing a tricolor filter in spiral slot 80.

Figure 19:
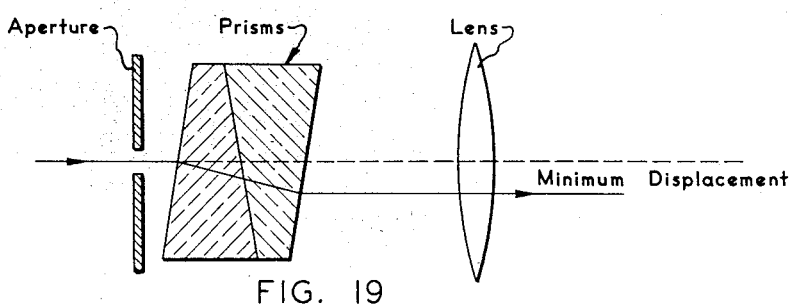
Figs. 19 and 20 are schematic diagrams illustrating optical systems for moving an aperture in a pattern.
Figure 20:
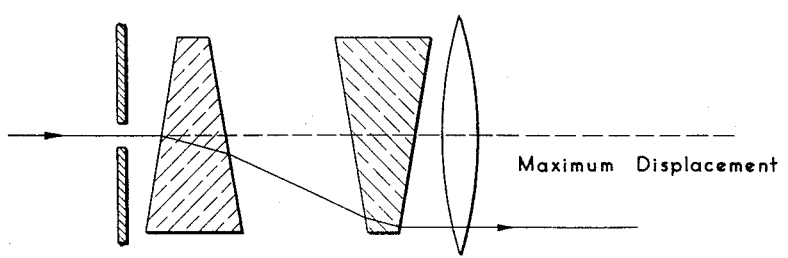

Reference is now made to Figs. 19 and 20 wherein there is illustrated optical means for moving an aperture in a pattern of concentric circles or in a spiral. The aperture may be defined by any suitable means fixedly located in front of a large apertured lens at the axis of the lens. Between the aperture and the lens are located a pair of wedge prisms through which light passes from the aperture to the lens. The prisms are so formed as to deviate a beam entering the aperture and falling on the lens so that when the prisms are rotated coaxially in the same direction and at the same speed, the beam moves in a circular pattern. To vary the diameter of the circular pattern so that the beam can be moved in either a spiral or a series of concentric circles, the separation between the prisms is varied, the extent of the displacement of the beam and the diameter of the circle of movement being proportional to the distance between the prisms. The area scanned by the beam passing through the aperture and scanned by the rotating prisms may be maintained substantially constant by two methods. The angular velocity of rotation of the prisms may be varied inversely as the displacement of the beam by the prisms or the size and/or shape of the aperture itself may be varied to maintain the scanned area constant. To adapt this means to colored cinematography, a tricolor filter may be provided completely filling the aperture.

Reference is now made to Figs. 21 through 23 wherein there is illustrated one embodiment of means for moving a "slow" or small apertured lens 120 in a spiral pattern or a pattern of concentric circles. The lens-moving means comprises a round disk 122 having an enlarged radial slot 124 with rounded ends. Lens 120 comprising a barrel 126 mounting the optical elements thereof is mounted in slot 124 for limited radial movement. To retain lens 120 in slot 124 with its axis parallel to the axis of disk 122, there is provided a flange 128 surrounding lens barrel 126, secured thereto or formed integrally therewith, and having a rear surface adapted to rest on the forward surface of disk 122. Flange 128 comprises two elongated end portions 130 adapted to cover slot 124 and prevent the admission of light through said slot regardless of the position of the lens within the slot. A retaining ring 132 adapted to screw onto lens barrel 126 and abut against the rear surface of disk 122 adjacent the edges of slot 124 is provided for retaining lens 120 within said slot.

Disk 122 includes a generally L-shaped or shouldered peripheral section 134 having conventional gear teeth 136 formed therein as means for rotating disk 122 about an axis through its center. Disk 122 is mounted for rotation in the camera housing, portions of which are indicated at 138 and comprise a wall having a flanged edge section 140 defining a round opening in which disk 122 is pivotally mounted, edge section 140 engaging disk 122 adjacent shouldered peripheral section 134 and seating said disk. To retain disk 122 against edge section 140 of housing 138, there is provided a retaining ring 144 secured to housing wall 138 and having an edge section 146 adapted to bear against peripheral section 134. Suitable drive means (not shown) for rotating disk 122 are provided mounted within the shutter housing and operatively coupled with disk 122 by a gear 148, mounted on shaft 150, within a recess 152 between edge section 140 and retaining ring 144, and meshed with teeth 136 on disk 122. It is important that lens 120 be held stationary during actual exposure so that the image formed is not blurred and, for this reason, the drive means preferably includes means adapted to transmit an intermittent motion to disk 122 so that the latter is rotated between successive exposures and is at rest during each exposure.

Means are provided for effecting the radial movement of lens 120 with respect to disk 122 during rotation of the latter in order to move lens 120 in a spiral pattern or a pattern of concentric circles. In the form shown, this means comprises two brackets 154 secured to or formed integrally with flange 128 on opposite sides of slot 124. Each bracket 154 includes a tapped hole adapted to receive the threaded portion 158 of a shaft 156, the axes of said shafts being parallel to one another and to the axis of slot 124. Each shaft 156 is mounted for rotary movement in a pair of brackets 160 and 162, secured to or formed integrally with disk 122. Shafts 156 are restrained against axial movement so that when they are rotated, threaded portions 158 coact with the tapped holes in brackets 154 to effect the radial movement of lens 120 in slot 124. Each of shafts 156 is rotated, for example, by a conventional hypoid gear 164 secured to the ends of shaft 156 and meshed with a corresponding hypoid ring gear 166 secured to or formed integrally with retaining ring 144 on housing 138. In the form shown wherein gear 166 is fixed and gears 164 secured to shafts 156 are constantly in mesh with gear 166, the lens would be moved in a spiral pattern since the axial movement of the lens would be continuous during rotational movement of disk 122. To move lens 120 in a series of concentric circles, suitable gearing means may be provided coupled with gear 166 so as to rotate shafts 156 periodically for short periods, for example, at the end of each revolution of disk 122, or shafts 156 may be provided with means for transmitting an intermittent or periodic movement thereto in place of gear 164.

While the mechanism of Figs. 21 through 23 has been illustrated as adapted to the moving of a small apertured lens, it is to be understood that it may also be adapted to the moving of an aperture in a pattern relative to a large apertured lens. Means defining an aperture of the desired size and shape may be substituted in the place of lens 120 and means may also be provided for varying the size and/or shape of the moving aperture.

As previously noted, it is important that the image formed by a moving lens be stationary during exposure of the photosensitive emulsion if the record thereof is not to be blurred. This may be effected not only by holding the lens stationary during exposure and moving it only between successive exposures, but may be effected by a continuously moving lens coupled with optical means for maintaining the image stationary with respect to the photosensitive emulsion. This may be effected, for example, by providing two lens components which together comprise a "taking" lens and which are moved continuously in opposite directions. The two lens components may, for example, be moved in a spiral pattern in opposite directions, the relative speeds and directions of movement of the two lens components being such that they become aligned or overlap in a succession of positions arranged in a spiral pattern, with successive exposures being made during alignment or overlapping of the two lens components. The relative optical powers of the two lens components and their speed relative to each other and to the photosensitive emulsion can be so coordinated that movement of the image in one direction by one lens component is compensated for by movement of the image in the opposite direction by the other lens component so that the image remains substantially stationary on the emulsion layer during exposure. Two lens-moving means of the type illustrated in Fig. 21 may be provided, each mounting one of two lens components comprising a "taking" lens and rotated in opposite directions at different angular velocity so as to move each component in a spiral pattern. The relative power of each of the two components would be inversely proportional to its linear velocity relative to the emulsion.

Figure 24:
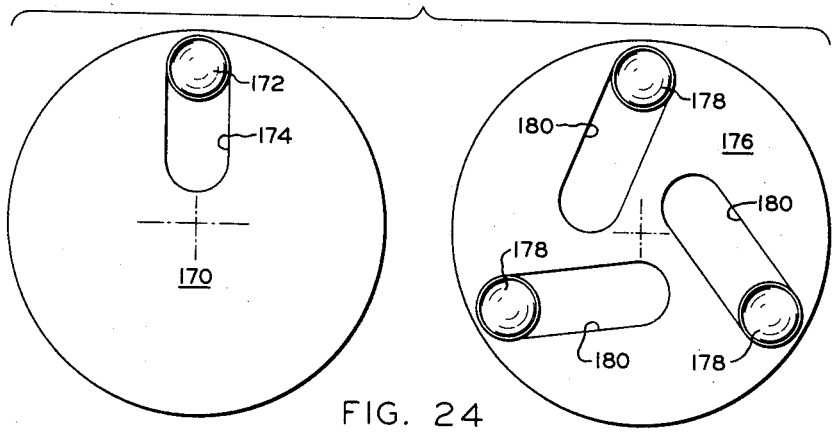
Fig. 24 is a somewhat schematic plan view of means for moving lens components in a pattern in opposite directions.

Since the duration of each successive exposure is a function of the period during which the two components are in overlapping relation and when components are provided and moved in opposite directions in spiral patterns, the exposure period is necessarily of relatively short duration and may be too short for many practical purposes. For this reason and in a preferred embodiment illustrated diagrammatically in Fig. 24, one lens component is rotated in one direction and a plurality of lens components are rotated in the opposite direction. For example, a first disk 170 is provided with a single lens component 172 mounted for radial movement in slot 174 and a second disk 176 is provided with three lens components 178 mounted for movement toward and away from the center of disk 176 in slots 180 formed therein. The lens components in both disks are moved in a spiral pattern or a pattern of concentric circles as the two disks are rotated in opposite directions. By virtue of the provision of three lens components 178 mounted on disk 176, the latter may be rotated at a slower angular velocity (one-third as fast) than when there is only one lens component 178, with a corresponding increase in the length of exposure or period of overlapping of two lens components 172 and 178.

Figure 25:
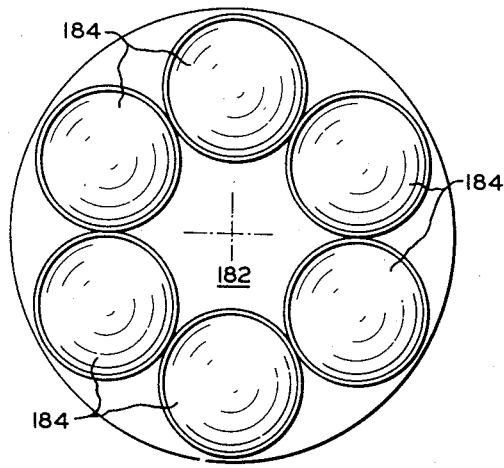
Fig. 25 is a somewhat schematic plan view of one element of the means of Fig. 24.
Figure 26:
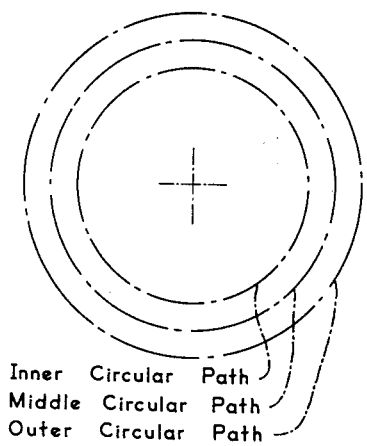
Figs. 26 and 27 are diagrams of the patterns of movement of the lens components of Figs. 24 and 25.
Figure 27:
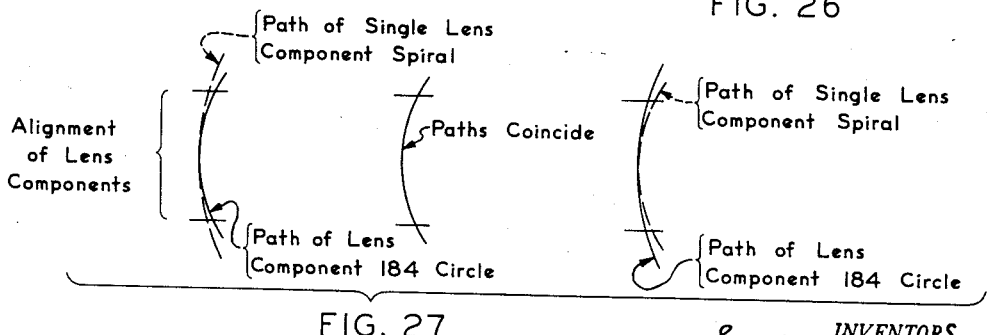

The provision of three lens components rotating in one direction may also result in exposure periods which are too short for the purposes intended. It has been found, however, that for most practical purposes, the paths of the axes of oppositely moving lens components do not have to coincide during overlapping of the components and that a slight difference in paths does not cause critical movement of the image on the emulsion. This permits, in a preferred form of lens-moving means illustrated in Fig. 25, a disk 182 to be provided, for example, with six lens components 184 fixedly mounted on the disks so that their axes move in a single circle when the disk is rotated and which may provide exposures of substantially long duration. A second lens component which, together with a lens component 184, comprises a taking lens, may be mounted on a disk so that its axis is moved in three concentric circles illustrated in Fig. 26. The axes of the six lens components 184 scan the middle circle while the axis of the second lens component scans not only the middle circle but outer and inner circles which are in sufficient proximity to the middle circle so that failure of the paths of the axes of two lens components comprising the "taking" lens to coincide does not cause critical movement of the image during exposure. The single lens component may also be moved in a spiral pattern of three revolutions so that during the first and third revolutions, the paths of the axes of the single lens component and a lens component 184 describe, during overlapping of the components, arcs of different diameters substantially tangent to one another (as illustrated in Fig. 27), and, during the second of three revolutions of the single lens component, the arcuate paths coincide. By virtue of this arrangement, only negligible movement of the image results from the failure of the paths of the axes of the contra-rotating lens components to coincide during overlapping of the components.

Figure 28:
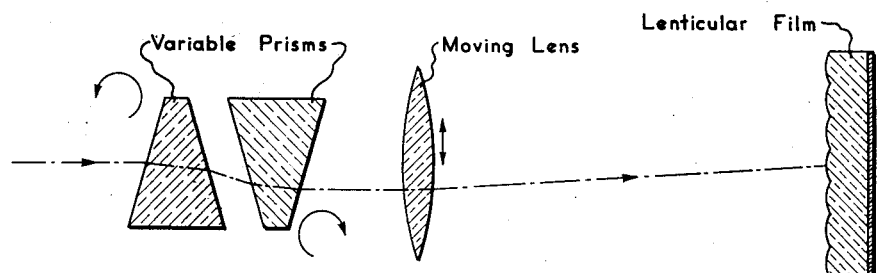
Fig. 28 is a schematic diagram illustrating an optical system for and methods of producing a stationary image by a moving lens.
Figure 29:
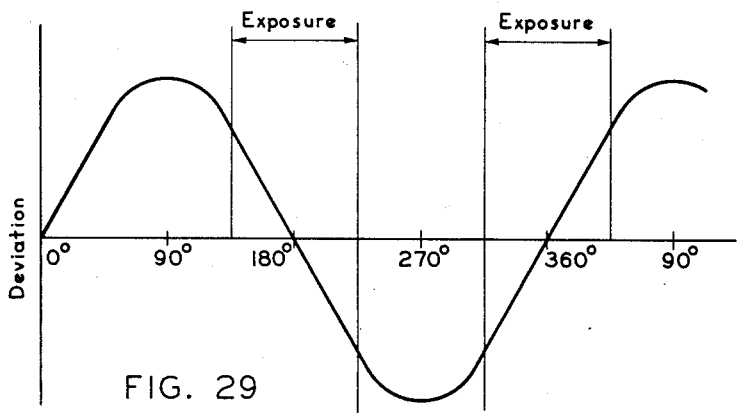
Fig. 29 is a diagram illustrating the operation of the system and method of Fig. 28.

Optical means coupled with a moving lens to maintain stationary the image formed by the lens are illustrated diagrammatically in Fig. 28 and comprise variable prisms positioned in front of the moving lens. A pair of wedge prisms coaxially mounted and rotated in opposite directions at the same speed will deviate a beam by varying amounts dependent upon their relative angular positions. During the rotation of each prism through 90°, the deviation of a light beam passing through both prisms varies from a maximum, when the deviation of each beam reinforces the other, to nothing when the deviation of the beam by each prism cancels the other. Referring now to Fig. 29, consider a plane parallel to the axes of the variable prisms (and to the axis of a moving lens). The magnitude of the deviation of a beam by the variable prisms in this plane is sinusoidal and is represented by a sine curve the ordinate of which is the magnitude of deviation and the abscissa being the angle of rotation of the prisms. At a reference point, the magnitude of the deviation of the beam is 0, when both prisms are rotated in opposite directions through 90°, the magnitude of the deviation is a maximum, at 180° it is 0, again at 270° it is a maximum in the opposite direction, and at 360° it is 0. The straight line portion of the curve, for example, between 120° and 210° and between 300° and 390° where the rate of change (acceleration) of the magnitude of the deviation is substantially constant, represents the period during which the rate of linear movement (deviation) of the beam is substantially constant and during which exposure is made. By moving the lens in the opposite direction of the deviating or moving beam and at the same linear velocity, the movement of the beam is compensated for by the oppositely moving lens and the image formed on the photosensitive emulsion is substantially motionless.

The lens may be moved in a spiral pattern or a pattern of concentric circles and when the lens is moved, for example, at constant angular velocity, the linear velocity of the lens varies as the distance from the center of rotation. If the radial movement of the lens is relatively small, the velocity of the deviation of the beam by the variable prisms can be made to coincide with the mean linear velocity of the lens and with minor variations from the means producing no appreciable movement of the image. Additionally, the linear velocity of the moving lens may be maintained constant by varying the angular velocity inversely as the radius of rotation of the moving lens when said lens is moved in a spiral pattern or in a pattern of concentric circles. When the linear velocity of the moving lens is varied, as when the angular velocity is maintained constant, means may be provided for varying the size of the aperture of the moving lens.

Another method of producing a cinematographic record which is the equivalent of a record formed by moving a "slow" taking lens is to move the lenticular and photosensitive emulsion layers in a pattern with respect to a stationary taking lens. The film unit may be retained in suitable holding means in position to be exposed and the holding means moved in a pattern of concentric circles or a spiral pattern which is the equivalent of moving the lens in the same pattern. In this method, means of the type previously described must be provided for maintaining the image stationary with respect to the emulsion during exposure.

To adapt the foregoing methods and apparatus to the production of a cinematographic record which may be exhibited to depict the subject in color, the "slow" taking lens is provided with a tricolor filter comprising the primary colors and completely filling the lens aperture, or the lens may be coupled with any suitable optical means for splitting the "taking" beam into three beams each representing a component primary present in the original beam.

Methods of and systems for viewing or projecting a composite photographic record made by using a "fast" taking lens and moving an aperture or by moving a "slow" taking lens, are substantially the same as the taking methods and systems but with the light directed in the opposite direction. One method for projecting a composite cinematographic record of the type produced by using a "fast" taking lens and moving the aperture in a pattern is illustrated diagrammatically in Fig. 30 together with a typical projection system. A cinematographic record of a subject comprising three sections designated A, B and C and produced by making an exposure at each of four successive positions of an aperture in the manner previously described and illustrated in Fig. 4, is positioned in a conventional slide projector with the lenticules toward the projection lens. The projector includes an extended source of illumination, a condensing lens and a "fast" or large apertured projection lens. The entire cinematographic record is illuminated and the illuminating beams passing through the increments comprising each successive image are directed by the lenticules to different areas of the projection lens corresponding in position to the position of the moving aperture of the taking lens. Consider, for example, an extended light source from which three beams emanate and pass through different areas of the condensing lens, the latter directing each beam to the image increments underlying a lenticule. The light source is shown as divided into four sections designated by the numerals 1 through 4, and each of the three beams comprises a ray from each of these four sections, each ray being directed by the condensing lens to one of the image elements. For purposes of illustration, rays $A_1$, $B_1$ and $C_1$ originating from section 1 of the source and directed to image elements $A_1$, $B_1$ and $C_1$, respectively, and rays designated $A_3$, $B_3$ and $C_3$, are shown. The beams pass through the lenticules, are reversed, and are so directed by the lenticules that all the rays from each section of the source pass through a discrete area of the projection lens. The projector is provided with an aperture-forming means which may be moved in a pattern identical to the pattern of movement of the taking aperture and, as shown in the diagram for illustrative purposes, can be moved to positions numbered 1 through 4 corresponding to the four positions of the taking aperture of Fig. 4. At each successive position of the movable projector aperture, a different area of the projection lens is utilized to project the elements comprising one of a succession of composite images directed through that portion of the lens by the lenticules in substantially the same manner as in taking.

Figure 30:
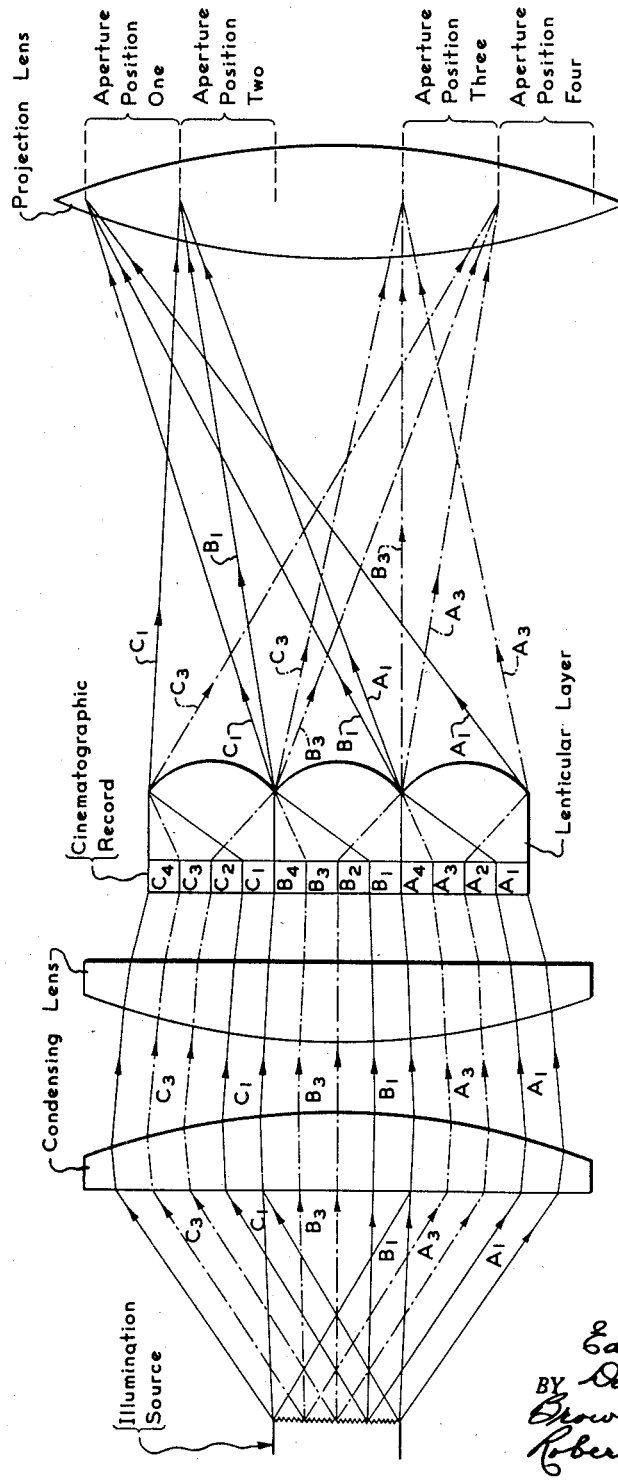
Fig. 30 is a schematic diagram of an optical system for exhibiting a composite cinematographic record produced by the system and method of Fig. 4.

The projection system illustrated in Fig. 30 is somewhat inefficient insofar as the "fast" projection lens is concerned since the entire aperture of the lens is always illuminated but only a portion of the aperture of the lens is utilized at any time. A more efficient method of illuminating the cinematographic record of this type is to provide a small source of illumination which is sufficient only to illuminate the increments comprising one image and to move the source of illumination so as to illuminate the increments comprising each image in succession. One optical system for doing this is illustrated diagrammatically in Fig. 31 and comprises a small source of illumination, a condensing lens shown as having two components, a projection lens and a pair of wedge prisms coaxially mounted between the condensing lens components and so constructed as to displace beams emanating from the light source and passing through the condensing lens. The prisms are of the type previously described and illustrated in Figs. 19 and 20 and may be moved axially with respect to one another to vary the magnitude of displacement of a beam passing through them and are rotated coaxially at the same speed to move the beam in a pattern of concentric circles or in a spiral pattern. The lenticular film is positioned in the projector with the lenticules toward the condensing lens so that the moving projection beam is directed by the lenticules through the elements comprising a particular one of the succession of images dependent on the angle at which the moving illuminating beam falls upon the lenticules. This form of projection system includes a stationary "fast" projection lens with means for moving an aperture around the lens in a pattern corresponding to the pattern of movement of the illuminating beam. A similar system for projecting a record, formed as previously described and illustrated in Fig. 4 by moving an aperture around a "fast" taking lens, in which the locus of the illumination source is, in effect, moved in a pattern, is illustrated diagrammatically in Fig. 32 and includes a right angle optical path from the light source to the projection lens. The axes of the two condensing lens components are perpendicular to one another and a variable mirror is located between the two lens components so as to direct beams emanating from the light source and passing through one condensing lens component through the other component to the lenticular film positioned with the lenticules toward the condensing lens. The axis of the mirror may be moved so as to move the light beams passing through the condensing lens in the same manner as the beams are moved by the two wedge prisms of Fig. 31. There are shown, for purposes of illustration, three light beams emanating from a relatively small illumination source and directed by the mirror shown at two of its four positions through the lenticules to illuminate the increments comprising two of the succession of four images. The mirror is shown at its two extreme positions, that is, at positions for projecting the first and the fourth images comprising the record.

Figure 31:
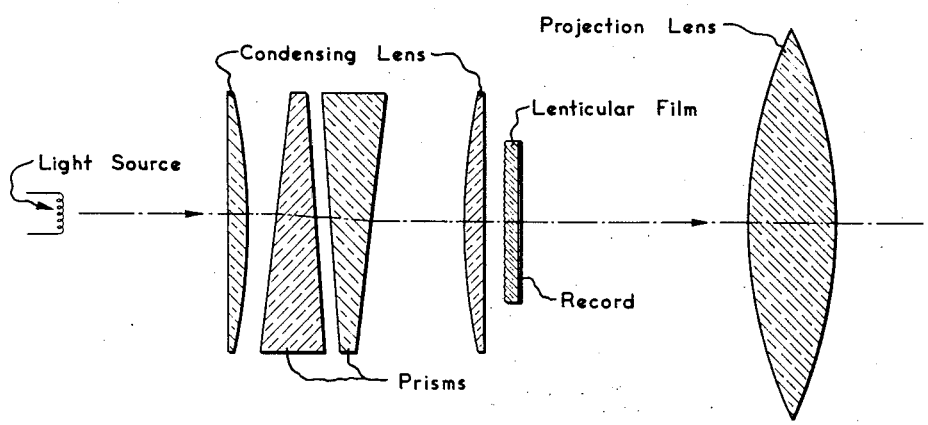
Figs. 31 and 32 are schematic diagrams illustrating optical systems of the type disclosed in Fig. 30.
Figure 32:
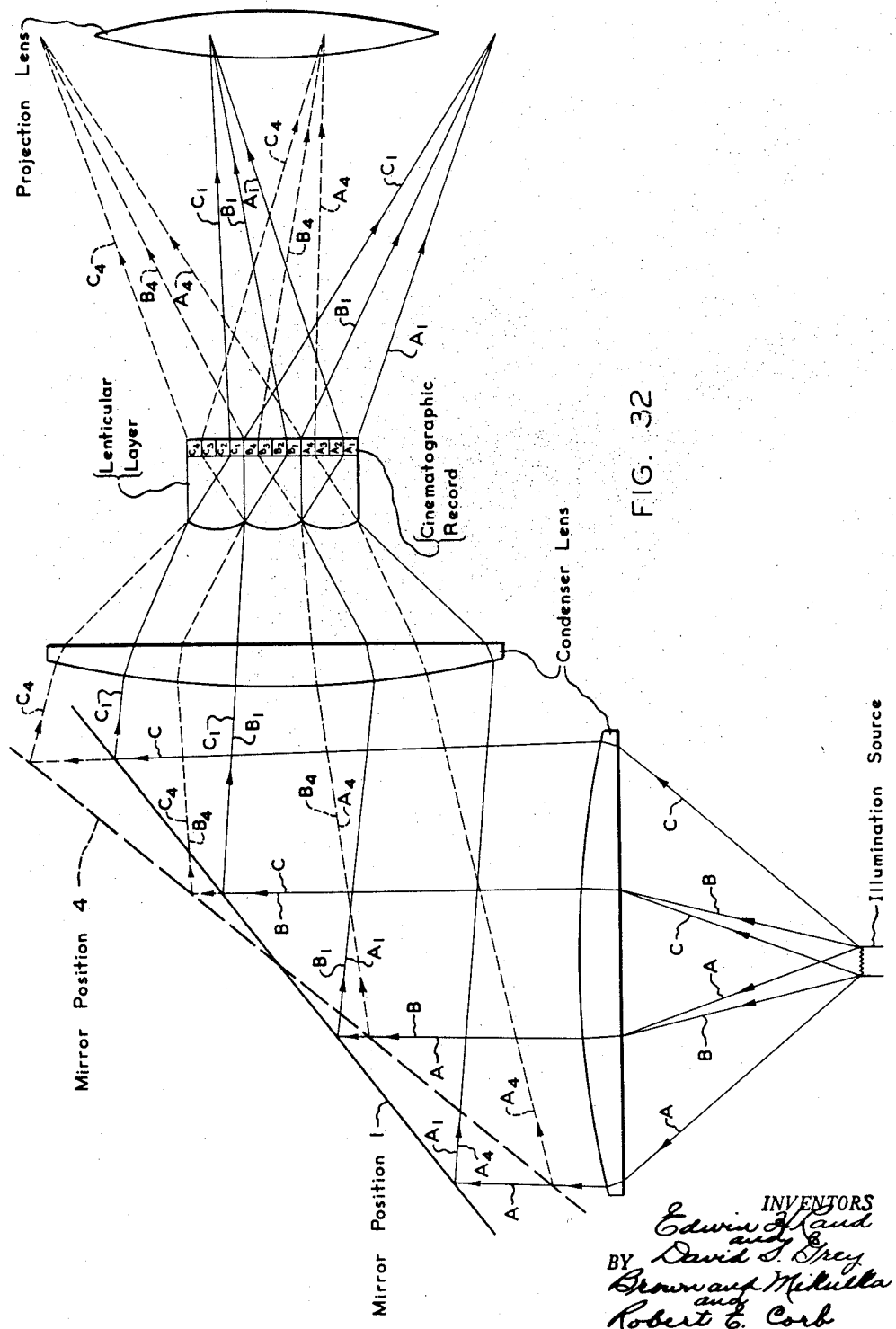

In projection systems of the type illustrated in Figs. 31 and 32, the illuminating light is moved so as to illuminate only the elements comprising each image in succession so as to achieve maximum utilization of the available light. However, with the lenticules positioned toward the condensing lens, the light passing through the record to the projection lens is dispersed by an amount proportional to the numerical aperture of the lenticules, and the center of dispersion is displaced with respect to the axis of the projection lens by an amount dependent on the position of the moving taking aperture. If the projection lens were of an effective aperture equal to that of the taking lens, the divergence of the projecting light coupled with displacement of the center of dispersion would result in a variation in brightness of the projected image, the image appearing dim when displacement is greatest so that a scene, taken by moving an aperture in a pattern of concentric circles or a spiral pattern, would appear, when projected or viewed, to be relatively bright at one end and relatively dim at its other end. In the case of the record illustrated in Fig. 32, images 1 and 4 would appear comparatively dim and images 2 and 3 would appear comparatively bright. This problem can be solved, for example, by providing diaphragm means for controlling the aperture of the projection lens or by providing a projection lens having a relatively large aperture sufficient to accommodate the dispersed projection beam at its greatest displacement. While both of these systems are essentially satisfactory, they offer certain disadvantages since in the first only a portion of the projection light is used and in the second the provision of such a large projection lens is initially expensive and is inefficient. A more preferred solution to this problem is to provide a second lenticular element on the projection lens side of the record with its lenticules in registration with the lenticules on the condenser side of the record. The second lenticular element would then collect the beams previously dispersed by the first lenticular element, thereby obviating the necessity of an extra large projection lens or for diaphragm means associated therewith. The form of film assemblage illustrated in Fig. 1 could be adapted to this purpose by providing backing layer 30 of the same material and thickness as lenticular layer 22 with its rear surface having lenticules identical to and registered with lenticules 24 of layer 22. The lenticular backing layer would then be permanently laminated as previously described with the photosensitive and image-receiving layers during processing.

The projection systems of Figs. 31 and 32 can be adapted to use as viewers by providing a suitable magnifying lens or ocular in place of the projection lens together with a diffusing element substantially in the record plane to compensate for the movement of the center of dispersion of the light during presentation of the scene. These projection systems have been illustrated as comprising the elements of a conventional slide or "still" projector coupled with means for moving an aperture or light source and may also include shutter means for intermittently illuminating the cinematographic record so as to project the images at the same frequency successive "taking" exposures were made. In addition, the lens-moving means or the light source moving means may be moved either continuously or intermittently between projection of successive images and remain stationary during projection. To adapt the projection systems of the foregoing type to color cinematography, a tricolor filter of the same type as used in taking may be provided in association with the moving illumination source. For example, a first condensing lens may be provided for forming an image of the illumination source, a suitable filter is located at the image, and a second condensing lens is provided for directing the illuminating light through the record to the projection or viewing lens.

Figure 33:
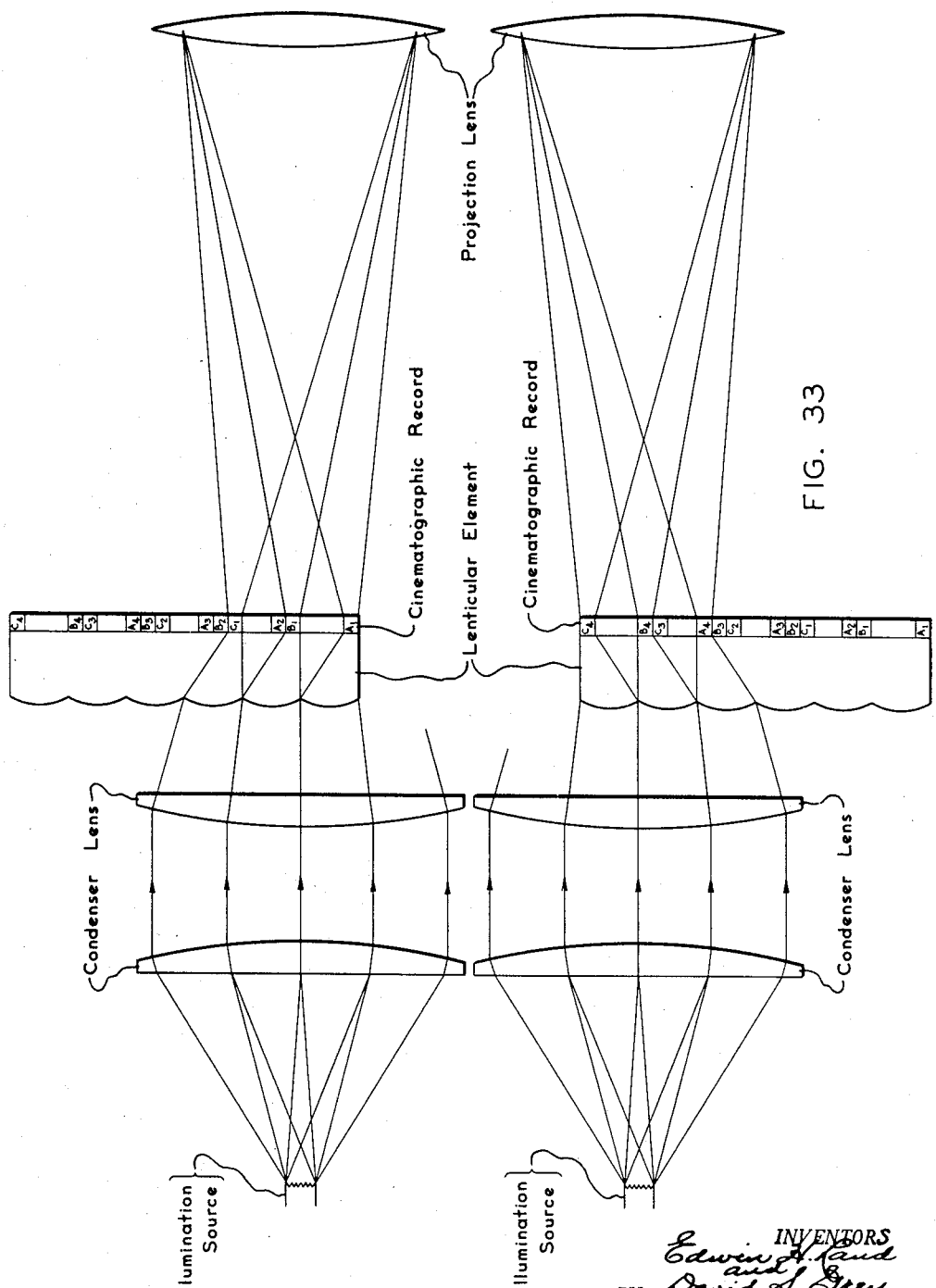
Fig. 33 is a schematic diagram illustrating an optical system for exhibiting a composite cinematographic record produced by the system and method of Fig. 6.

Reference is now made to Fig. 33 wherein there is illustrated schematically a system for exhibiting a composite cinematographic record produced by moving a "slow" taking lens in a pattern. A cinematographic record of a subject, comprising three sections designated A, B and C produced by making four successive exposures, one at each of four successive positions of the taking lens, as previously described and illustrated in Fig. 6, is positioned in such means as the illustrated projector between a two-element condensing lens and a "fast" projection lens with the lenticules toward the condensing lens. The illustrated illumination source is relatively small, being only slightly larger than is necessary to adequately illuminate the elements comprising each successive image, and the illuminating beams, four of which are shown for illustrative purposes, are directed by the condensing lens and lenticules through the elements comprising one image at a time. To exhibit the images in succession, the record together with the lenticular layer is moved in a pattern identical to the pattern of movement of the taking lens. In the form shown in Fig. 3, the record is moved in a straight line and is illustrated at positions for exhibiting elements A, B and C of images 1 and 4. This system may be adapted to use as a viewer by simply substituting a suitable magnifier or ocular for the projection lens since a diffusion element is unnecessary as the dispersed light does not move relative to the objective. This system may also be adapted to the exhibition of successive images in color by providing a filter means similar to that used in taking in association with the illumination source and a diffusing element in association with the record. Additionally, means may be provided for moving the record either continuously or intermittently at the same frequency as the taking lens or for illuminating the record either continuously or intermittently at the same frequency as the taking exposure.

While there has been shown a system for exhibiting a composite cinematographic record, formed by moving a slow taking lens, by moving the record itself and illuminating substantially only the elements comprising each successive image at one time, it is to be understood that a projection system is conceivable wherein this type of record is entirely illuminated. However, such a system would be impractical since only a small fraction of the available illuminating light is utilized. For this reason, the form of exhibition means shown is more preferred since the light source need only be slightly larger than is necessary to adequately illuminate, at any time, the elements comprising only one of the succession of images.

Means of the type disclosed for carrying out the method of the present invention may be embodied in a camera of the self-developing type now well known in the art. With proper design and/or with minor modification, the camera could lend itself to use as a means for exhibiting a composite cinematographic record produced therein and at least many of the elements of the camera would find utility in a projector or viewer for the record. With such a camera, it is possible for the operator to photographically record a scene lasting several seconds, process the record in the camera and immediately view the processed record.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. In a photographic system for producing and exhibiting a composite cinematographic record comprising a multiplicity of sequentially formed composite images of a moving subject to create the appearance of motion, in combination, objective lens means having a relatively large aperture, means providing a multiplicity of minute optical elements positioned in the path of light passing through said lens means, obturator means associated with said lens means for providing a movable aperture and being movable so as to vary the dimensions of said movable aperture, means for rotating said obturator means at constant angular velocity, and means responsive to rotary movement of said obturator means for moving said movable aperture radially with respect to its center of rotation while varying its dimensions.

2. In a photographic system for producing and exhibiting a composite cinematographic record comprising a multiplicity of sequentially formed composite images of a moving subject to create the appearance of motion, in combination, objective lens means having a relatively large aperture, means providing a multiplicity of minute optical elements positioned in the path of light passing through said lens means, obturator means associated with said lens means and providing a movable aperture smaller than the aperture of said lens means, said obturator means including a pair of members cooperating to define said movable aperture and means mounting said members for rotary movement with respect to each other and said lens means, and means for so rotating said members with respect to each other and said lens means as to rotate said movable aperture, move said movable aperture radially with respect to its center of rotation and vary the dimensions of said movable aperture during rotary movement thereof.

3. The photographic system of claim 2 wherein said obturator means includes filter means for separating the light passing through said movable aperture into a plurality of primary colors.

4. In a photographic system for producing and exhibiting a composite cinematographic record comprising a multiplicity of sequentially formed composite images of a moving subject to create the appearance of motion, in combination, objective lens means having a relatively large aperture, means providing a multiplicity of minute optical elements positioned substantially in the focal surface of said objective lens means, obturator means associated with said lens means, said obturator means including a pair of disks each having a slot formed therein and adapted to define two sides of a movable aperture substantially smaller than the aperture of said lens means and means mounting said disks adjacent each other so that said slots define said movable aperture, said disks being mounted for rotary movement with respect to each other and said lens means, and means for so rotating said disks as to cause said movable aperture defined by the intersection of said slots to rotate and to move radially with respect to its center of rotation.

5. In the photographic system of claim 4, the combination, with said obturator means, of shutter means and means for causing said shutter means to make a sequence of exposures at successive discrete positions of said movable aperture.

6. The photographic system of claim 4 wherein filter means are provided in said slots in said disk for separating the light passing through said movable aperture into a plurality of primary colors.

7. The photographic system of claim 4 wherein the width of said aperture defined by said slots in said disks is varied and said means for rotating said disks is adapted to rotate said aperture at constant angular velocity.

8. The method of producing and exhibiting a composite cinematographic record of a scene of several seconds duration and comprising a multiplicity of sequentially formed composite images, said method comprising the steps of directing actinic light from the scene to be recorded through an optical system comprising a photographic taking lens and at least two relatively movable light-deviating components for displacing the path of actinic taking light through said system to a single frame of a photosensitive silver halide emulsion layer positioned for exposure to actinic light transmitted by said lens, interposing a transparent lenticular element between said lens and said photosensitive emulsion layer, limiting the transmission of actinic light by said lens to a discrete area thereof, sequentially exposing successive composite areas of said photosensitive emulsion layer by moving said light-deviating components relative to one another for varying the extent of displacement of the path of the taking light, rotating said light-deviating components so as to select in a pattern a sequence of discrete areas of said photographic taking lens through which the taking light is directed, while maintaining said lenticular element in superposition with said emulsion layer forming a visible composite cinematographic record on said transparent lenticular element directly from said photosensitive emulsion layer by transfer and reduction of the silver of unexposed silver halide, directing illuminating light along a path through said lenticular element and said visible record to lens means for exhibiting a picture to an observer, and moving the locus of the illuminating light path in a pattern with respect to said lens means identical to the pattern of movement of the light-transmitting area of said taking lens.

9. The method of claim 8 comprising the steps of directing the illuminating light through optical means comprising at least two relatively movable light-deviating components included in said optical system for displacing the path of said illuminating light, moving said components so as to vary the extent of displacement of the path of illuminating light, and rotating said light-deviating components so as to move the illuminating light path in a pattern identical to the pattern of movement of the light-transmitting area of the taking lens.

10. The method of producing a composite cinematographic record comprising a multiplicity of sequentially formed composite images, said method comprising the steps of sequentially exposing a single frame of a photosensitive emulsion layer to actinic light directed through a lenticular element from a photographic taking lens to form a sequence of composite latent images in said emulsion layer, limiting the light transmitted by said lens by aperture-providing means associated with said lens and defining an aperture positioned in the path of light transmitted by said lens to said emulsion layer, during exposure moving said aperture-providing means so as to move said aperture in a generally circular pattern with respect to said emulsion layer, while moving said aperture in a circular pattern varying one of the angular velocity of movement of said aperture and the dimensions of said aperture so as to maintain substantially constant the area scanned with respect to said emulsion layer during successive exposures, the area of said aperture being maintained substantially constant during variation in the dimensions of said aperture, and, while maintaining registration between said emulsion layer and said lenticular element, forming from said exposed emulsion layer a visible composite cinematographic record composed of successive composite images in identical registration with said lenticular element.

11. The method of claim 10 wherein said aperture is moved in a circular pattern at constant angular velocity and the dimensions of said aperture are varied in accordance with the radial distance of said aperture from the center of its pattern of movement.

12. The method of claim 11 wherein the angular dimension of said aperture is varied directly as the radial distance of said aperture from said center of its pattern of movement and the radial dimension of said aperture is varied inversely as the radial distance of said aperture from said center of said pattern of movement.

13. The method of claim 10 wherein the dimensions of said aperture are maintained constant and the angular velocity of said aperture is varied in accordance with the radial distance of said aperture from the center of its pattern of movement.

14. The method of claim 13 wherein the angular velocity of movement of said aperture is varied inversely as the radial distance of said aperture from said center of said pattern of movement.

15. The method of claim 10 wherein said aperture is moved in a circular pattern at constant angular velocity and the size of said aperture is varied in accordance with the radial distance of said aperture from the center of its pattern of movement.

16. The method of producing a composite cinematographic record comprising a multiplicity of sequentially formed composite images of a subject, said method comprising the steps of sequentially exposing a single frame of a photosensitive emulsion layer to actinic light from a photographic taking lens to form a sequence of composite latent images in said emulsion layer, limiting the area of said lens through which light from the subject is transmitted to said emulsion layer by interposing means defining a movable aperture in the path of said light, during exposure moving said movable aperture in a circular pattern with respect to said emulsion layer and interposing between said lens and said emulsion layer a transparent lenticular element having a multiplicity of minute lens elements each capable of imaging said aperture on said emulsion layer, while moving said aperture in a circular pattern varying one of the angular velocity of movement of said aperture and the dimensions of said aperture so as to maintain substantially constant the area scanned with respect to said emulsion layer during successive exposures, the area of said aperture being maintained substantially constant during variation in the dimensions of said aperture, and, while maintaining registration between said emulsion layer and said lenticular element, forming from said exposed emulsion layer a visible composite cinematographic record composed of successive composite images in identical registration with said lenticular element.

17. The method of producing and exhibiting a composite cinematographic record of a scene of several seconds duration and comprising a multiplicity of sequentially formed composite images of said scene, said method comprising the steps of sequentially exposing a single frame of a photosensitive emulsion layer to actinic light from a photographic taking lens to form a sequence of composite latent images in said emulsion layer, limiting the light transmitted by said lens by aperture-providing means associated with said lens and defining an aperture positioned in the path of light transmitted by said lens to said emulsion layer, during exposure moving said aperture-providing means so as to move said aperture in a generally circular pattern with respect to said emulsion layer and interposing between said lens and said emulsion layer a transparent lenticular element having a multiplicity of minute lens elements each capable of imaging said aperture on said emulsion layer, while moving said aperture in a circular pattern varying one of the angular velocity of movement of said aperture and the dimensions of said aperture so as to maintain substantially constant the area scanned with respect to said emulsion layer during successive exposures, the area of said aperture being maintained substantially constant during variation in the dimensions of said aperture, while maintaining registration between said emulsion layer and said lenticular element forming from said exposed emulsion layer a visible composite cinematographic record composed of successive composite images in identical registration with said lenticular element, and directing illuminating light through said visible record and said lenticular element to means for presenting a picture to an observer so as to sequentially present the composite images comprising said visible record in the same sequence as formed and thereby reproduce any motion in the scene depicted.

18. The method of producing and exhibiting a composite cinematographic record of a scene of several seconds duration and comprising a multiplicity of sequentially formed composite images of said scene, said method comprising the steps of sequentially exposing a single frame of a photosensitive emulsion layer to actinic light from a photographic taking lens to form a sequence of composite latent images in said emulsion layer, limiting the area of said lens through which light from the subject is transmitted to said emulsion layer by interposing means defining a movable aperture in the path of said light, during exposure moving said movable aperture in a circular pattern with respect to said emulsion layer and interposing between said lens and said emulsion layer a transparent lenticular element having a multiplicity of minute lens elements each capable of imaging said aperture on said emulsion layer, while moving said aperture in a circular pattern varying one of the angular velocity of movement of said aperture and the dimensions of said aperture so as to maintain substantially constant the area scanned with respect to said emulsion layer during successive exposures, the area of said aperture being maintained substantially constant during variation in the dimensions of said aperture, while maintaining registration between said emulsion layer and said lenticular element forming from said exposed emulsion layer a visible composite cinematographic record composed of successive composite images in identical registration with said lenticular element, and directing illuminating light through said visible record and said lenticular element to means for presenting a picture to an observer so as to sequentially present the composite images comprising said visible record in the same sequence as formed and thereby reproduce any motion in the scene depicted.

19. The method of producing a composite cinematographic record comprising a multiplicity of sequentially formed composite images of a subject, said method comprising the steps of sequentially exposing a single frame of a photosensitive emulsion layer to actinic light from a photographic taking lens to form a sequence of composite latent images in said emulsion layer, limiting the area of said lens through which light from the subject is transmitted to said emulsion layer by interposing means defining a movable aperture in the path of said light, during exposure moving said movable aperture in a circular pattern with respect to said emulsion layer and interposing between said lens and said emulsion layer a transparent lenticular element having a multiplicity of minute lens elements each capable of imaging said aperture on said emulsion layer, while moving said aperture in a circular pattern maintaining substantially constant the area of said aperture while varying one of the angular velocity of movement of said aperture and the dimensions of said aperture so as to maintain substantially constant the area scanned with respect to said emulsion layer during successive exposures, the area of said aperture being maintained substantially constant during variation in the dimensions of said aperture, and, while maintaining registration between said emulsion layer and said lenticular element, forming from said exposed emulsion layer a visible composite cinematographic record composed of successive composite images in identical registration with said lenticular element.

20. The method of claim 19 wherein said aperture is moved in a circular pattern at constant angular velocity and the dimensions of said aperture are varied in accordance with the radial distance of said aperture from the center of its pattern of movement.

21. The method of claim 20 wherein the angular dimension of said aperture is varied directly as the radial distance of said aperture from said center of its pattern of movement and the radial dimension of said aperture is varied inversely as the radial distance of said aperture from said center of said pattern of movement.

22. The method of claim 19 wherein the dimensions of said aperture are maintained constant and the angular velocity of said aperture is varied in accordance with the radial distance of said aperture from the center of its pattern of movement.

23. The method of claim 22 wherein the angular velocity of movement of said aperture is varied inversely as the radial distance of said aperture from said center of said pattern of movement.

24. The method of claim 19 wherein said aperture is moved in a pattern of nonoverlapping concentric circles.

25. The method of claim 19 wherein said aperture is moved in a spiral pattern.

26. The method of producing and exhibiting a composite cinematographic record of a scene of several seconds duration and comprising a multiplicity of sequentially formed composite images of said scene, said method comprising the steps of sequentially exposing a single frame of a photosensitive emulsion layer to actinic light from a photographic taking lens to form a sequence of composite latent images in said emulsion layer, limiting the area of said lens through which light from the subject is transmitted to said emulsion layer by interposing means defining a movable aperture in the path of said light, during exposure moving said movable aperture in a circular pattern with respect to said emulsion layer and interposing between said lens and said emulsion layer a transparent lenticular element having a multiplicity of minute lens elements each capable of imaging said aperture on said emulsion layer, while moving said aperture in a circular pattern maintaining substantially constant the area of said aperture while varying one of the angular velocity of movement of said aperture and the dimensions of said aperture so as to maintain substantially constant the area scanned with respect to said emulsion layer during successive exposures, the area of said aperture being maintained substantially constant during variation in the dimensions of said aperture, while maintaining registration between said emulsion layer and said lenticular element forming from said exposed emulsion layer a visible composite cinematographic record composed of successive composite images in identical registration with said lenticular element, and directing illuminating light through said visible record and said lenticular element to means for presenting a picture to an observer so as to sequentially present the composite images comprising said visible record in the same sequence as formed and thereby reproduce any motion in the scene depicted.

27. The method of producing a composite cinematographic record comprising a multiplicity of sequentially formed composite images, said method comprising the steps of sequentially exposing a single frame of a photosensitive emulsion layer through a transparent element having a goffered surface to actinic light from a photographic taking lens including an aperture-providing means defining an aperture located in the path of light transmitted by said lens to said emulsion layer, during exposure moving said taking lens and said aperture-providing means in a generally circular pattern with respect to said emulsion layer and said transparent element, varying the angular velocity of movement of said aperture and taking lens, and, while maintaining registration between said emulsion layer and said transparent element, forming from said exposed emulsion layer a visible composite cinematographic record composed of successive composite images in identical registration with said transparent element.

28. The method of claim 27 wherein the dimensions of said aperture are maintained constant and the angular velocity of movement of said aperture and said lens is varied in accordance with the radial distance of said aperture and said lens from the center of their pattern of movement.

29. The method of producing a composite cinematographic record comprising a multiplicity of sequentially formed composite images, said method comprising the steps of sequentially exposing a single frame of a photosensitized surface to actinic light from a photographic taking lens comprising at least two optical components mounted for movement relative to one another and aperture-providing means associated with at least one of said components and movable therewith, moving one component of said taking lens and said aperture-providing means in a circular pattern relative to said photosensitized surface, moving another component of said taking lens in the opposite direction, superposing a transparent element having a goffered surface with said photosensitized surface between the latter and said taking lens, while moving said one component and said aperture-providing means in a circular pattern varying one of the angular velocity of movement of said one component and aperture-providing means and the dimensions of the aperture defined by said aperture-providing means, and, while maintaining said photosensitized surface in superposition with said transparent element, forming from said photosensitized surface a visible composite cinematographic record composed of successive composite images in identical registration with said transparent element.

30. The method of claim 29 wherein said lens components are rotated so that their optical axes become substantially aligned during each sequential exposure.

31. The method of claim 29 wherein one of said optical components of said lens is moved continuously at a predetermined linear speed and another component of said lens is moved in the opposite direction at a linear speed relative to the linear speed of said one moving component which is in inverse proportion to the relative optical powers of the two moving lens components.

32. The method of producing and exhibiting a composite cinematographic record of a scene of several seconds duration and comprising a multiplicity of sequentially formed composite images of said scene, said method comprising the steps of sequentially exposing a single frame of a photosensitive emulsion layer to actinic light from a photographic taking lens comprising at least two optical components mounted for movement relative to one another and an aperture-providing means associated with at least one of said components and movable therewith, during exposure moving one component of said taking lens and said aperture-providing means in a circular pattern relative to said emulsion layer and moving another component of said taking lens in the opposite direction, superposing on said emulsion layer between the latter and said lens a transparent lenticular element having a multiplicity of minute lens elements each capable of forming an image of the aperture defined by said aperture-providing means on said emulsion layer, while moving said one component and said aperture-providing means in a circular pattern varying one of the angular velocity of movement of said one component and said aperture-providing means and the dimensions of said aperture, while maintaining registration between said emulsion layer and said lenticular element forming from said exposed emulsion layer a visible composite cinematographic record composed of successive composite images in identical registration with said lenticular element, and directing illuminating light through said visible record and said lenticular element to means for presenting a picture to an observer so as to sequentially present the composite images comprising said visible record in the same sequence as formed and thereby reproduce any motion in the scene depicted.

33. The method of producing a composite cinematographic record comprising a multiplicity of sequentially formed composite images, said method comprising the steps of sequentially exposing a single frame of a photosensitized surface to actinic light from a photographic taking lens to form a sequence of composite latent images on said photosensitized surface, limiting the light transmitted by said lens by aperture-providing means associated with said lens and defining an aperture positioned in the path of light transmitted by said lens to said photosensitized surface, superposing with said photosensitized surface between the latter and said lens a lenticular element including a multiplicity of minute lens elements capable of forming an image of the aperture defined by said aperture-providing means on said photosensitized surface, during exposure deviating the taking light in a first direction at substantially constant velocity and moving said taking lens and said aperture-providing means in a generally circular pattern with respect to said photosensitized surface and lenticular element in substantially the opposite direction, while moving said lens and said aperture in a circular pattern varying one of the angular velocity of movement of said aperture and said lens and the dimensions of said aperture so as to maintain substantially constant the area scanned with respect to said emulsion layer during successive exposures, the area of said aperture being maintained substantially constant during variation in the dimensions of said aperture, and, while maintaining said photosensitized surface in superposition with said lenticular element, forming from said photosensitized surface a visible composite cinematographic record composed of successive composite images in identical registration with said lenticular element.

34. The method of producing and exhibiting a composite cinematographic record of a scene of several seconds duration and comprising a multiplicity of sequentially formed composite images of said scene, said method comprising the steps of sequentially exposing a single frame of a photosensitive emulsion layer to actinic light from a photographic taking lens to form a sequence of composite latent images in said emulsion layer, limiting the light transmitted by said lens by aperture-providing means associated with said lens and defining an aperture positioned in the path of light transmitted by said lens to said emulsion layer, superposing on said emulsion layer between the latter and said lens a transparent lenticular element having a multiplicity of minute lens elements each capable of forming an image of the aperture defined by said aperture-providing means on said emulsion layer, during exposure deviating the taking light transmitted by said lens in a first direction at substantially constant velocity and moving said taking lens and said aperture in a generally circular pattern with respect to said emulsion layer and said lenticular element in substantially the opposite direction, while moving said lens and aperture in a circular pattern varying one of the angular velocity of movement of said aperture and said lens and the dimensions of said aperture so as to maintain substantially constant the area scanned with respect to said emulsion layer during successive exposures, the area of said aperture being maintained substantially constant during variation in the dimensions of said aperture, while maintaining registration between said emulsion layer and said lenticular element forming from said exposed emulsion layer a visibile composite cinematographic record composed of successive composite images in identical registration with said lenticular element, and directing illuminating light through said record and said lenticular element to means for presenting a picture to an observer so as to sequentially present the composite images comprising said visible record in the same sequence as formed and thereby reproduce any motion in the scene depicted.

35. In a photographic system for producing a composite cinematographic record of a scene of several seconds duration and comprising a multiplicity of sequentially formed composite images in a single photographic frame, in combination, an objective lens means, means providing a multiplicity of minute optical elements positioned in the path of light transmitted by said lens means, obturator means associated with said lens means for providing an aperture of constant area in the path of light transmitted by said lens means, means for so moving said obturator means as to rotate said aperture with respect to said minute optical elements about an axis extending outside said aperture and parallel with the axis of said lens means, said obturator means including means for moving said aperture radially with respect to its axis of rotation during rotation, means for varying one of the angular velocicty of rotation of said aperture and the dimensions of said aperture, and means for maintaining the area of said aperture substantially constant during variation in the dimensions of said aperture.

36. In a photographic system for producing a composite cinematographic record of a scene of several seconds duration and comprising a multiplicity of sequentially formed composite images in a single photographic frame, in combination, an objective lens, aperture-providing means associated with said lens, means providing a multiplicity of minute lens elements so located with respect to said lens and a photosensitive layer as to form thereon images of the aperture provided by said aperture-providing means, and means for moving said aperture-providing means so as to rotate said aperture with respect to said minute lens elements about an axis extending outside of said aperture and parallel with the axis of said lens, said aperture-providing means including means for moving said aperture radially with respect to its axis of rotation, means for varying one of the angular velocity of rotation of said aperture and the dimensions of said aperture, and means for maintaining the area of said aperture substantially constant during variation in the dimensions of said aperture.

37. A photographic system as defined in claim 36 wherein said aperture-providing means comprise at least two light-opaque members disposed in the path of light transmitted through said lens, each of said light-opaque members including a light-transmitting section, means mounting said light-opaque members for movement relative to one another and said minute lens elements, said aperture being defined by the intersection and alignment of at least portions of said light-transmitting sections of said members, and said light-transmitting sections being so formed and arranged that when said members have moved with respect to one another and said lens elements said aperture defined thereby is caused to be translated along a circular path of varying radius.

38. A photographic system as defined in claim 36 wherein said aperture-providing means comprise at least two light-opaque members disposed in the path of light transmitted through said lens, each of said light-opaque members including a light-transmitting section, means mounting said members for movement relative to one another and said minute lens elements, and means for so moving said members relative to one another and said minute lens elements that at least portions of said light-transmitting sections intersect and become aligned to define said aperture and said aperture is rotated relative to said minute lens elements and is moved radially with respect to its center of rotation.

39. A photographic system as defined in claim 38 wherein said light-opaque members comprise a pair of disks mounted coaxially for rotation with respect to one another and said minute lens elements and said light-transmitting sections of said disks comprise at least a radial slot in one of said disks for defining two sides of said aperture and at least a generally annular slot in the other of said disks intersecting the first-mentioned slot and defining the other two sides of said aperture.

40. A photographic system as defined in claim 39 wherein said radial slot is sector shaped and said means for moving said aperture-providing means is effective to rotate said disks at substantially constant angular velocity.

41. A photographic system as defined in claim 39 wherein the sides of said radial slot are parallel and said means for moving said aperture-providing means is effective to rotate said disks at varying angular velocities.

42. A photographic system as defined in claim 39 wherein said radial slot is sector shaped and said other disk includes means defining at least two substantially annular slots so positioned with respect to one another as to scan nonoverlapping areas during rotation of said other disk and whose radial widths are inversely proportionable to the radial distances of said slots from the center of rotation of said other disk.

43. A photographic system as defined in claim 39 wherein said radial slot is in the form of a sector and said other disk includes means defining a spiral slot whose radial dimension varies in inverse proportion to the radial distance of said slot from the center of rotation of said other disk.

44. In a photographic system for producing a composite cinematographic record of a scene of several seconds duration and comprising a multiplicity of sequentially formed composite images in a single photographic frame, in combination, objective lens means, aperture-providing means associated with said lens means and defining an aperture for transmitting light through said lens means, means providing a multiplicity of minute optical elements in the path of light transmitted by said lens means and said aperture and capable of forming images of said aperture on a photosensitized surface, mounting means associated with said lens means, means mounting said mounting means for rotary movement relative to said minute optical elements, at least said aperture-providing means being mounted on said mounting means in association with said lens means for radial movement relative to the center of rotation of said mounting means, means coupled with said mounting means for causing the radial movement of at least said aperture-providing means, means for imparting rotary motion to said mounting means, means for varying one of either the angular velocity of rotation of said mounting means and the dimensions of said aperture, and means for maintaining the area of said aperture substantially constant during variation in the dimensions of said aperture.

45. In a photographic system for producing a composite cinematographic record of a scene of several seconds duration and comprising a multiplicity of sequentially formed composite images in a single photographic frame, in combination, a photographic objective lens comprising at least two optical components, aperture-providing means associated with at least one of said optical components and defining an aperture for transmitting light through said optical components, means mounting said components for movement relative to one another, means for moving said mounting means in opposite directions so that said components move along separate paths that intersect at a plurality of discrete positions arranged in a circular pattern, and a transparent lenticular element including a multiplicity of minute lens elements capable of forming images of said aperture on a photosensitized surface superposed with said lenticular element, said lens, when said components overlap, directing light through said lenticular element to said photosensitized surface, the latter being adapted to be processed to form therefrom a visible composite cinematographic record in superposition with said lenticular element.

46. The photographic system of claim 45 wherein one of said optical components of said lens has associated therewith filter means for separating the light passing through said one component and said aperture into a plurality of primary colors.

47. In a photographic system for producing a composite cinematographic record of a scene of several seconds duration and comprising a multiplicity of sequentially formed composite images in a single photographic frame, in combination, a photographic objective lens comprising a first optical component and at least a second optical component, at least said first optical component including aperture-providing means defining an aperture for transmitting light through said components, means for mounting said first component and said aperture-providing means for movement in a path in one direction, means for mounting at least a second component of said lens for movement along a second path in the opposite direction, said paths being so arranged as to intersect at a plurality of locations arranged in a circular pattern and the speed of movement of said components being such that the axes of said components become substantially aligned during intersection of their paths at a predetermined frequency, and a transparent lenticular element superposed with a photosensitive layer in position to direct light transmitted by said lens when said components are in substantial alignment with said photosensitive layer, the latter being adapted to be processed to form therefrom a visible composite cinematographic record in superposition with said lenticular element.

48. In a photographic system for producing a composite cinematographic record of a scene of several seconds duration and comprising a multiplicity of sequentially formed composite images in a single photographic frame, in combination, a photographic objective lens comprising a first optical component and at least a second optical component, aperture-providing means associated with at least said first optical component and defining an aperture for transmitting light through said components, a first scanning disk mounted for rotary movement, means for movably mounting said first optical component and said aperture-providing means on said first scanning disk, a second scanning disk coaxially mounted for rotary movement with said first scanning disk, means movably mounting at least said second component on said second scanning disk, means for rotating said scanning disks at predetermined speeds in opposite directions, means responsive to the rotary movement of said scanning disks for moving said components and said aperture-providing means radially with respect to the center of rotation of the scanning disks on which they are mounted so that their paths of movement intersect and said first component and said second component overlap at predetermined frequency at a plurality of discrete positions arranged in a generally circular pattern, and a transparent lenticular element including a multiplicity of minute lens elements capable of forming an image of said aperture on a photosensitive layer superposed with said lenticular element, said photosensitive layer being adapted to be processed to form therefrom a visible composite cinematographic record in superposition with said lenticular element.

49. The photographic system of claim 48 wherein said second disk includes a plurality of said second components mounted for movement radially with respect to the axis of rotation of said disks.

50. The photographic system of claim 48 wherein said first optical component is mounted for limited radial movement on said first scanning disk and said second scanning disk includes a plurality of said second components fixedly mounted on said second disk so as to move in a circular path the diameter of which is substantially equal to the mean of the diameters of the largest and smallest possible circular paths of movement of said first component.

References Cited in the file of this patent

UNITED STATES PATENTS

| 2,086,182 | Dvornik | July 6, 1937 |
| 2,267,961 | Tillyer et al. | Dec. 30, 1941 |

FOREIGN PATENTS

| 421,120 | Great Britain | Dec. 10, 1934 |

OTHER REFERENCES

Courtney-Pratt, "Fast Multiple Frame Photography," Journal of Photographic Science, vol. 1, No. 1, pages 21–40, January 1953.

UNITED STATES PATENT OFFICE
CERTIFICATION OF CORRECTION

Patent No. 2,950,644                          August 30, 1960

Edwin H. Land et al.

It is hereby certified that error appears in the above numbered patent requiring correction and that the said Letters Patent should read as corrected below.

Column 2, line 5, for "a" read -- an --; column 3, line 43, for "projected" read -- projection --; column 4, line 16, for "sibstantially" read -- substantially --; line 46, for "is", first occurrence, read -- it --; line 65, for "deatil" read -- detail --; column 7, line 59, for "correnponding" read -- corresponding --; column 8, line 62, for "last" read -- least --; column 9, line 8, after "would" insert -- be --; line 9, for "sucessive" read -- successive --; line 73, for "priphery" read -- periphery --; column 17, line 27, for "of" read -- for --; column 19, line 46, for "disk" read -- disks --; column 25, line 66, for "velocicty" read -- velocity --; column 27, line 18, strike out "either".

Signed and sealed this 25th day of July 1961.

(SEAL)
Attest:

ERNEST W. SWIDER
Attesting Officer

DAVID L. LADD
Commissioner of Patents